(12) United States Patent
Hunter et al.

(10) Patent No.: US 12,062,018 B2
(45) Date of Patent: Aug. 13, 2024

(54) METHODS AND APPARATUS FOR ASSESSING CANDIDATES FOR VISUAL ROLES

(71) Applicant: AQUENT LLC, Boston, MA (US)

(72) Inventors: Zachary Hunter, Asheville, NC (US); Eric Witherspoon, Burnsville, NC (US); Matthew Toney, Weaverville, NC (US); Brennan Carlson, Falmouth, MA (US); Lauren Pehnke, Somerville, MA (US); Shanthi Gudigopuram, Ashland, MA (US); Yan Yan, Waltham, MA (US); Daryl Rue, Asheville, NC (US); Nadav Lapidot, Asheville, NC (US); Jeremy Wood, Swannanoa, NC (US); Frank Romeu, Quincy, MA (US); Kimberley Croscup, Toronto (CA)

(73) Assignee: AQUENT LLC, Boston, MA (US)

( * ) Notice: Subject to any disclaimer, the term of this patent is extended or adjusted under 35 U.S.C. 154(b) by 257 days.

(21) Appl. No.: 17/028,805

(22) Filed: Sep. 22, 2020

(65) Prior Publication Data
US 2021/0089570 A1   Mar. 25, 2021

Related U.S. Application Data

(60) Provisional application No. 62/904,486, filed on Sep. 23, 2019.

(51) Int. Cl.
*G06Q 10/1053*   (2023.01)
*G06F 16/51*   (2019.01)
(Continued)

(52) U.S. Cl.
CPC ......... *G06Q 10/1053* (2013.01); *G06F 16/51* (2019.01); *G06F 16/538* (2019.01);
(Continued)

(58) Field of Classification Search
CPC ...... G06F 16/538; G06F 16/51; G06F 40/279; G06T 7/10; G06T 2207/20021;
(Continued)

(56) References Cited

U.S. PATENT DOCUMENTS

2007/0239756 A1* 10/2007 Li ..................... G06F 16/951
707/999.102
2009/0094223 A1* 4/2009 Berk .................. G06F 16/3338
707/999.005
(Continued)

OTHER PUBLICATIONS

International Search Report and Written Opinion for International Application No. PCT/US2020/052013 mailed Dec. 23, 2020.
(Continued)

*Primary Examiner* — Hosain T Alam
*Assistant Examiner* — Saba Ahmed
(74) *Attorney, Agent, or Firm* — Wolf, Greenfield & Sacks, P.C.

(57) ABSTRACT

The techniques described herein relate to methods, apparatus, and computer readable media configured to receive a set of images associated with a candidate, wherein each image is a visual work created by the candidate, and process the set of images using one or more machine learning techniques, artificial intelligence techniques, or both, to add the set of images to a search index.

21 Claims, 40 Drawing Sheets

(51) Int. Cl.
*G06F 16/538* (2019.01)
*G06F 18/21* (2023.01)
*G06F 18/24* (2023.01)
*G06F 40/279* (2020.01)
*G06N 20/00* (2019.01)
*G06T 7/10* (2017.01)

(52) U.S. Cl.
CPC .............. *G06F 18/21* (2023.01); *G06F 18/24* (2023.01); *G06F 40/279* (2020.01); *G06N 20/00* (2019.01); *G06T 7/10* (2017.01); *G06T 2207/20021* (2013.01); *G06T 2207/20081* (2013.01); *G06T 2207/20084* (2013.01)

(58) Field of Classification Search
CPC .......... G06T 2207/20081; G06T 2207/20084; G06N 20/00; G06K 9/6217; G06K 9/6267
USPC ......................................................... 707/741
See application file for complete search history.

(56) References Cited

U.S. PATENT DOCUMENTS

| | | | |
|---|---|---|---|
| 2014/0037218 A1* | 2/2014 | Zweig ................. | G06F 16/5866 382/218 |
| 2018/0025003 A1* | 1/2018 | Marriott ................. | G06F 16/51 707/740 |
| 2019/0058919 A1* | 2/2019 | Cahill ................... | G06F 16/535 |
| 2019/0102914 A1* | 4/2019 | Stefanov .................. | G06T 7/90 |
| 2019/0236371 A1* | 8/2019 | Boonmee ............. | G06V 10/764 |
| 2021/0042830 A1* | 2/2021 | Burke ................. | G06Q 20/384 |

OTHER PUBLICATIONS

Alkhawlani et al., Text-based, content-based, and semantic-based image retrievals: a survey. International Journal of Computer and Information Technology. Jan. 31, 2015;4(01):58-66.

Yang et al., Under the hood: Photo Search. Facebook Engineering. May 22, 2017:10 pages. https://engineering.fb.com/2017/05/22/ml-applications/under-the-hoodphoto-search/ [last accessed Oct. 12, 2020].

* cited by examiner

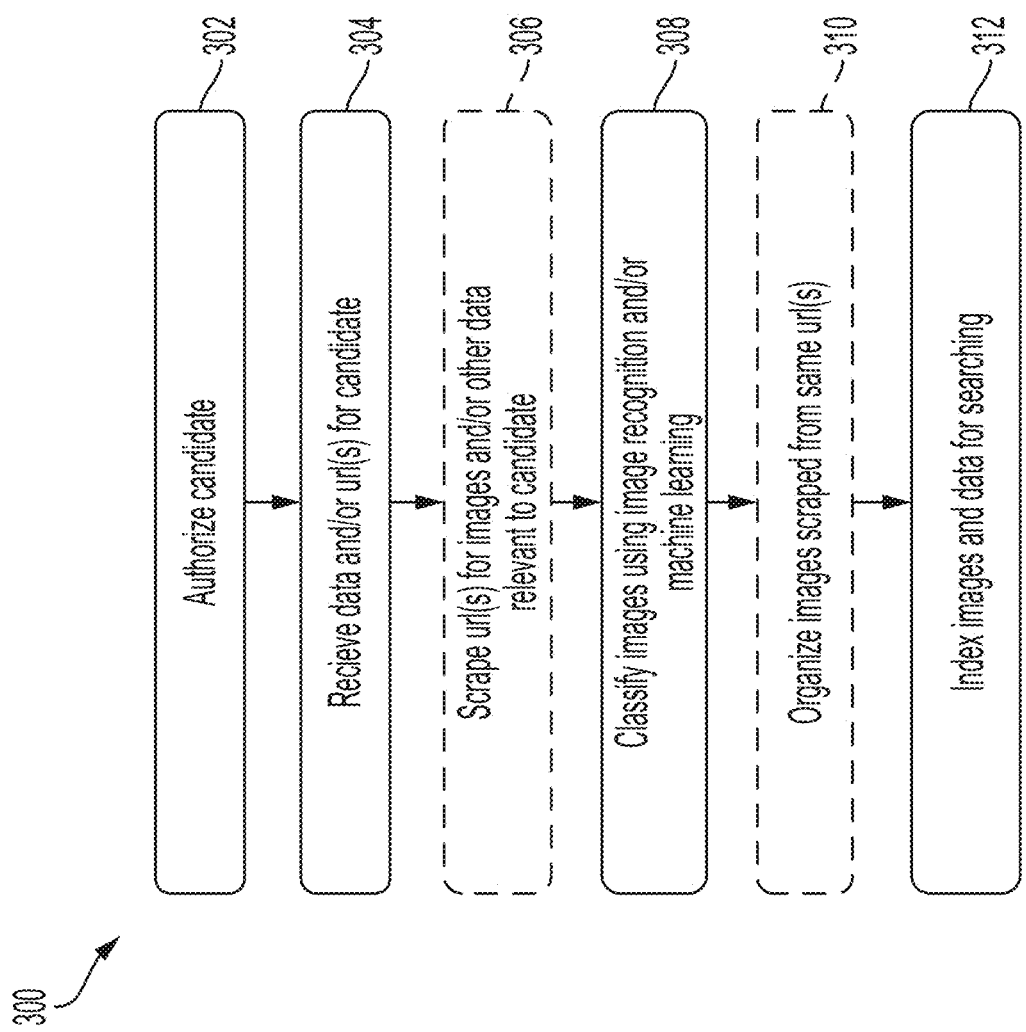

☐ Wade Warren

UI Designer
Los Angeles, USA
RTW
Available immediately
$75-100 | $85-110k

*View work samples*

Creative Director at Nike 2018 - Present
Art Director at Puma 2015 - 2018
Associate Art Director at Puma 2014 - 2015
Senior Brand Designer at Puma 2012- 2014
Brand designer at Adidas 2011 - 2012

*Pin | Gather | Make candidate* —1822

Contact talent ⋯

1820

Last update *Kelli Whitecar* 10/11/2019

FIG. 20B ical field

METHODS AND APPARATUS FOR ASSESSING CANDIDATES FOR VISUAL ROLES

RELATED APPLICATIONS

This application claims priority under 35 U.S.C. § 119(e) to U.S. Provisional Application Ser. No. 62/904,486, filed Sep. 23, 2019, titled "METHODS AND APPARATUS FOR ASSESSING CANDIDATES FOR VISUAL ROLES", and which is incorporated by reference herein in its entirety.

TECHNICAL FIELD

The techniques described herein relate generally to assessing candidates for visual roles, and in particular the techniques relate to processing images of visual works using machine learning and artificial intelligence techniques to create a platform that allows users, such as companies or recruiters, to easily search data associated with candidates and their visual portfolios to identify candidates to fill visual roles.

BACKGROUND OF INVENTION

Traditionally, recruiting of creative talent for visual roles typically requires recruiters to identify prospective candidates based on resume content (e.g., work experience, specialties, skills, etc.) first and then manually evaluate their visual portfolios as a separate step, often disqualifying otherwise suitable candidates. In spite of the fact that talent portfolios are far more important than resumes when filling visual roles, recruiters must perform this cumbersome, time-consuming process due to lack of tools that enable them to evaluate candidates' fit for roles based on the visual artifacts within their respective portfolios.

SUMMARY OF INVENTION

In accordance with the disclosed subject matter, apparatus, systems, and methods are provided for a computing platform that can leverage artificial intelligence techniques and data mining techniques to facilitate searching for and vetting candidates for visual roles. The techniques provide for keyword-based searching of candidate portfolios for past work that matches a company's needs, while also allowing candidates to be filtered out based on more traditional resume content.

According to one aspect, a computer-implemented method for providing a visual talent search engine is provided. The method comprises: using a processor to perform: storing one or more search indexes for a plurality of images of visual works created by a plurality of talents; receiving data indicative of a search request; searching the one or more search indexes based on the received data to determine a set of search results, the set of search results comprising one or more of the plurality of images created by one or more of the plurality of talents; and displaying at least a portion of the set of search results using a graphical user interface, the displaying comprising displaying the one or more images in association with the one or more talents in the graphical user interface.

According to one embodiment, the method further comprises ranking the set of search results based on the search query, wherein the ranking comprises applying natural language processing (NLP) similar term matching, NLP relevance, or both. According to one embodiment, the method further comprises: receiving at least one image of a visual work created by a talent; and processing the at least one image using one or more machine learning techniques to add the at least one image to the search index. According to one embodiment, the method further comprises: processing the at least one image by applying, to the at least one image, machine learning classification to generate at least one label for the at least one image; and using the at least one label to add the at least one image to the search index.

According to one embodiment, the method further comprises: processing the at least one image by applying, to the at least one image, machine learning object detection to generate at least one label for the at least one image; and using the at least one label to add the at least one image to the search index. According to one embodiment, the method further comprises: obtaining a set of images, comprising a set of training images, a set of validation images, a set of test images, or some combination thereof; dividing each image in the set of images into a plurality of sub-images; and augmenting a pre-trained neural network based on the plurality of sub-images.

According to one embodiment, wherein processing the at least one image comprises: dividing the at least one image into a plurality of sub-images; processing each of the sub-images using the one or more machine learning techniques to classify each sub-image; and averaging the classifications of the sub-images to determine a classification for the image. According to one embodiment, wherein processing the at least one image using the one or more machine learning techniques comprises using a neural network to classify the at least one image.

According to another aspect, a non-transitory computer-readable media is provided. The non-transitory computer-readable media comprises instructions that, when executed by one or more processors on a computing device, are operable to cause the one or more processors to execute: storing a search index for a plurality of images of visual works created by a plurality of talents; receiving data indicative of a search request; searching the search index based on the received data to determine a set of search results, the set of search results comprising one or more of the plurality of images created by one or more of the plurality of talents; and displaying at least a portion of the set of search results using a graphical user interface, the displaying comprising displaying the one or more images in association with the one or more talents in the graphical user interface.

According to one embodiment, wherein the instructions further cause the one or more processors to execute ranking the set of search results based on the search query, wherein the ranking comprises applying natural language processing (NLP) similar term matching, NLP relevance, or both.

According to one embodiment, wherein the instructions further cause the one or more processors to execute: receiving at least one image of a visual work created by a talent; and processing the at least one image using one or more machine learning techniques to add the at least one image to the search index. According to one embodiment, wherein the instructions further cause the one or more processors to execute: processing the at least one image by applying, to the at least one image, machine learning classification to generate at least one label for the at least one image; and using the at least one label to add the at least one image to the search index.

According to one embodiment, the instructions further cause the one or more processors to execute: processing the at least one image by applying, to the at least one image, machine learning object detection to generate at least one label for the at least one image; and using the at least one label to add the at least one image to the search index. According to one embodiment, processing the at least one image comprises: dividing the at least one image into a plurality of sub-images; processing each of the sub-images using the one or more machine learning techniques to classify each sub-image; and averaging the classifications of the sub-images to determine a classification for the image.

According to one aspect, a system is provided. The system comprises: a memory storing: instructions; and a search index for a plurality of images of visual works created by a plurality of talents; and a processor configured to: receive data indicative of a search request; search the search index based on the received data to determine a set of search results, the set of search results comprising one or more of the plurality of images created by one or more of the plurality of talents; and display at least a portion of the set of search results using a graphical user interface, the displaying comprising displaying the one or more images in association with the one or more talents in the graphical user interface.

According to one embodiment, the processor is further configured to: receive at least one image of a visual work created by a talent; and process the at least one image using one or more machine learning techniques to add the at least one image to the search index. According to one embodiment, the processor is further configured to: process the at least one image by applying, to the at least one image, machine learning classification to generate at least one label for the at least one image; and use the at least one label to add the at least one image to the search index.

According to one embodiment, the processor is further configured to: process the at least one image by applying, to the at least one image, machine learning object detection to generate at least one label for the at least one image; and use the at least one label to add the at least one image to the search index. According to one embodiment, the processor is further configured to: obtain a set of images comprising a set of training images, a set of validation images, a set of test images, or some combination thereof; divide each image in the set of images into a plurality of sub-images; and augment a pre-trained neural network based on the plurality of sub-images.

According to one embodiment, the processor is configured to process the at least one image by: dividing the at least one image into a plurality of sub-images; processing each of the sub-images using the one or more machine learning techniques to classify each sub-image; and averaging the classifications of the sub-images to determine a classification for the image.

According to another aspect, a computer-implemented method is provided. The method comprises: receiving a set of images associated with a candidate, wherein each image is a visual work created by the candidate; and process the set of images using one or more machine learning techniques, artificial intelligence techniques, or both, to add the set of images to a search index.

According to one embodiment, the method further comprises: receiving data indicative of a search request; searching the search index based on the received data to determine a set of search results, wherein each search result is associated with a candidate; displaying at least a portion of the set of search results using a graphical user interface, comprising displaying one or more images associated with each candidate. According to one embodiment, the method further comprises ranking the set of search results based on the search query, comprising applying natural language processing (NLP) similar term matching, NLP relevance, or both.

According to one embodiment, processing the set of images comprises applying, to each image of the set of images, one or more of machine learning object detection, image classifiers, or both, to generate a set of labels for the set of images, the method further comprising using the labels to add the set of images to the search index.

According to one embodiment, the method further comprises: receiving a set of images, comprising a set of training images, a set of validation images, a set of test images, or some combination thereof; dividing each image in the set of images into a plurality of sub-images; and augmenting a pre-trained neural network based on the plurality of sub-images. According to one embodiment, processing the set of images comprises, for each image in the set of images: dividing the image into a plurality of sub-images; processing each of the sub-images using the neural network to classify each sub-image; and averaging the classifications of the sub-images to determine a classification for the image.

According to another aspect, a non-transitory computer-readable media is provided. The non-transitory computer-readable media stores instructions that, when executed by one or more processors on a computing device, are operable to cause the one or more processors to execute the method comprising: receiving a set of images associated with a candidate, wherein each image is a visual work created by the candidate; and process the set of images using one or more machine learning techniques, artificial intelligence techniques, or both, to add the set of images to a search index.

According to another aspect, a system is provided. The system comprises a memory storing instructions, and a processor configured to execute the instructions to perform a method comprising: receiving a set of images associated with a candidate, wherein each image is a visual work created by the candidate; and process the set of images using one or more machine learning techniques, artificial intelligence techniques, or both, to add the set of images to a search index.

Some embodiments relate to a computer system comprising at least one processor in communication with a memory configured to store instructions that, when executed by the at least one processor, cause the processor to receive a set of images associated with a candidate, wherein each image is a visual work created by the candidate, and process the set of images using one or more machine learning techniques, artificial intelligence techniques, or both, to add the set of images to a search index.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3, which is a flow chart showing an exemplary computerized method for processing candidate images for the system, according to some embodiments.

FIG. 8 shows an exemplary project view user interface, according to some embodiments.

FIG. 15A-C show views of an exemplary saved talent user interface, according to some embodiments.

FIGS. 17A-C show views of an exemplary talent search user interface, according to some embodiments.

FIGS. 18A-B show views of an exemplary search result, according to some embodiments.

FIGS. 19A-C show views of an exemplary talent detail user interface, according to some embodiments.

FIGS. 20A-B show views of an exemplary talent search interface, according to some embodiments.

DETAILED DESCRIPTION OF INVENTION

Figure 1:
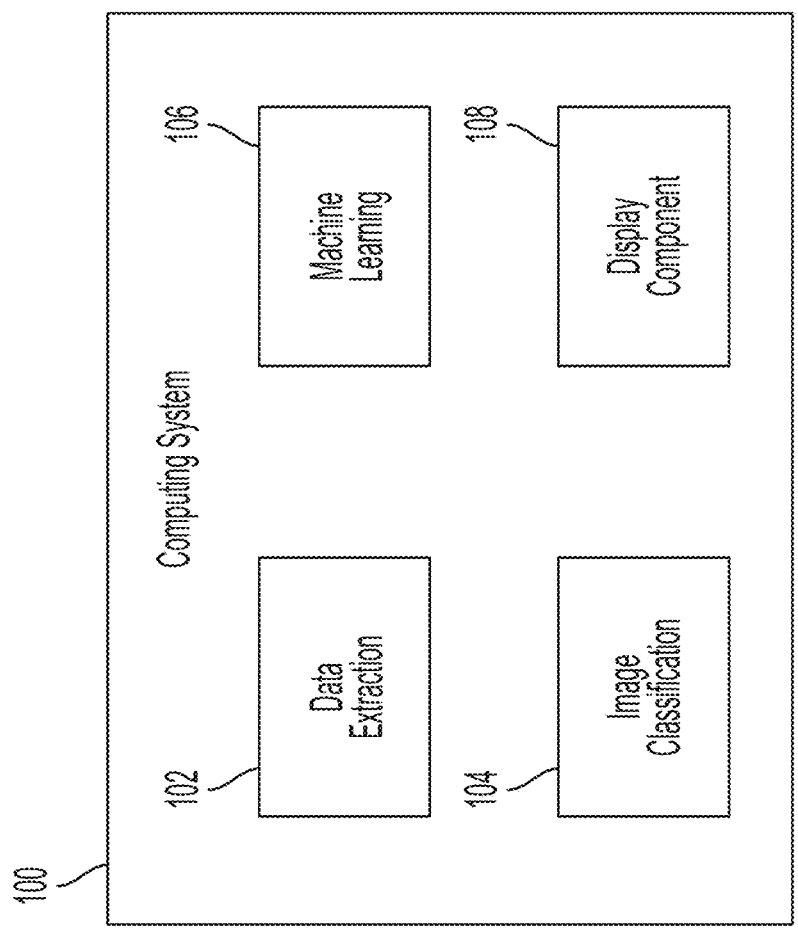
FIG. 1 is an exemplary computing system for providing a visual candidate intake and search platform, according to some embodiments.

The inventors have discovered and appreciated various deficiencies with existing recruitment platforms when vetting candidates to fill visual roles. Some platforms are focused around written profiles and related data, which does not support reviewing visual work samples. Other platforms are built as general repositories for individual designers to showcase their work, however they are typically not built for hiring purposes, and typically only provide manual image cataloguing and/or basic image processing, resulting in such platforms being inefficient resources to search for visual candidate (e.g., across marketing artifacts, design styles, and/or objects). As a result of these and other deficiencies, companies and staffing agencies are typically not able to quickly search candidate sample images, and therefore instead rely on traditional resume-based or profile-based platforms to source visual designers. Therefore, in spite of the fact that candidate portfolios can be far more important than resumes when filling visual roles, companies and/or recruiters first identify prospective candidates based on resume-based information, and then subsequently perform a cumbersome, time-consuming manual review of candidate portfolios due to an inability to evaluate a visual candidates' fit for roles based on the visual artifacts within their respective portfolios. This can result in a poor fit, since candidates identified based on resume data may not have a proper or relevant portfolio to demonstrate that they can do the work required by the open role. This can also result in a slow placement process, since it can take a long time to source and submit the right designers for an open position.

The inventors have developed a computing platform that can combine rich, up to date candidate profile information that includes not only skills and availability of the candidate, but also relevant images and samples of a candidate's work. The computing platform can both ingest candidate information (including portfolio images) and process the images to provide for keyword-based searching across portfolios of images. The techniques can include a Web content extraction technology designed to extract images and text from portfolio sites (e.g., URLs, including those with both known and unknown domains, such as candidate portfolio sites). The techniques can also leverage advanced machine learning and image processing technologies to process obtained image-based content to provide a visual search application that allows users to easily source creative candidates based on their visual portfolios. The machine learning approaches can include image classification (marketing artifacts and styles), object detection, natural language processing, and full text search. The techniques can reassemble the extracted content into searchable and scannable images and projects. These and other such techniques are described further herein.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 is an exemplary computing system 100 for providing a visual candidate intake and search platform, according to some embodiments. The computing system 100 includes a data extraction component 102, an image classification component 104, a machine learning component 106, and a display component 108. While the computing system 100 is shown using a single box, this is for illustrative purposes only and is not intended to be limiting. The distributed computing system 100 can include a plurality of computing devices, cloud computing devices, and/or the like, which can be configured to implement some and/or all of the components of the computing system 100. Additionally, the various components of the computing system 100 can be configured to communicate with each other to exchange data, distribute functionality across computing platforms, parallelize computing tasks, and/or the like.

The data extraction component 102 is adapted to extract web content from URLs, as discussed further in conjunction with FIG. 3. The image classification component 104 and machine learning component 106 are configured to use machine learning techniques to perform various aspects of the techniques described herein, including image classification, object detection, natural language processing, and/or full text search features. In some embodiments, the techniques can combine machine learning object detection with one or more of image classifiers (e.g., classifiers specific to an industry), along with Natural Language Processing (NLP) similar term matching, NLP relevance, and an ensemble machine learning recommendation engine to rank search results for images associated with talent portfolios. In some embodiments, the techniques can provide a guided search using recommended search terms that can be surfaced using one or more of a machine learning recommendation engine, natural language processing relevance, and natural language processing association.

In some embodiments, for machine learning object detection, the object detection analyzes an image and identifies each occurrence of something that it recognizes in that image. For example, the detection strategy can recognize subjects (e.g., a person), items (e.g., a bracelet), concepts (e.g., a diagram), and delivery medium (e.g., a billboard).

In some embodiments, for image classifiers, the techniques can curate training data specific to the visual candidate placement space, which can include thousands of hand selected images. The images can be used to train the image classifier to sort images into categories and classify them with a given percentage of confidence. Unlike object detection, the classifiers can look at the entire image and sort it into a given category. For example, the image classifiers can categorize images by physical delivery (e.g., brochure), digital delivery (e.g., email), era (e.g., retro), intended use (e.g., corporate), industry (e.g., interior design), graphic design techniques (e.g., infographic), artistic techniques (e.g., illustration), overall style (e.g., clean), graphic design style (e.g., luxe), and artistic style (e.g., glitch). In some embodiments, the system may use a neural network for image classification. For example, the system may use a deep neural network for image classification. Exemplary image classifiers can include Tensorflow, Keras, pre-trained models (e.g., based on Mobilnet v1.0.242 and VGG19), and/or the like. In some embodiments, the techniques can use existing models and freeze one or more of the initial layers and retrain one or more of the final layers to create a classifier that is specific to the space.

In some embodiments, for NLP similar term matching, the techniques can use a machine learning natural language processing model that is able to identify, synonyms, and similar terms. The matching can be done for a single term, multiple terms, and/or also in combination with guided search terms. Each similar term can be ranked by confidence. One or more synonym strategies can be used, and chosen for use based on context. Examples include Doc2Vec, GLOVE, and TF/IDF. In some embodiments, the techniques can include building a custom corpus base on words that talent use to describe their work. Some embodiments can include training from scratch and/or using pre-trained aspects. For example, in the case of Doc2Vec and TF/IDF, the techniques can train models from scratch. As another example, in the case of GLOVE, the techniques can retrofit over the initial GLOVE model using a custom lexicon built from words that talent use to describe their work, as well as image classification labels and labels from object detection.

In some embodiments, for NLP relevance, the techniques can determine if there are image classification or object detection labels that are relevant to the current free text search. The labels can be ranked by confidence and included as fuzzy matches. The techniques may rank labels by determining a score between a textual search query and labels (e.g., of a search index). Exemplary strategies can include GLOVE and TF/IDF. In some examples, the TF/IDF multilabel supervised model can use a count vectorizer with ngram support, and LinearSVC to associate text with image classification and object detection labels. In some embodiments, such as in the case of GLOVE, the techniques can retrofit over the initial GLOVE model using a custom lexicon built from words that talent use to describe their work, as well as image classification labels and labels from object detection.

In some embodiments, NLP association can be used where associated terms are closely related but do not have the same meaning (e.g., unlike similar terms). Such terms can be ranked by confidence and included as soft matches. Using unsupervised models, such as models used in synonym matching, the techniques can return terms that have a strong correlation with the search term or terms, but are not synonyms. One or more mathematical models can be used to determine whether there is a strong correlation, which can use strategies such as referencing a common term and excluding it from the set which forces an orthogonal term that is closely related, but not a synonym.

In some embodiments, the machine learning recommendation engine can rank search term results, such as by looking at a given users usage and objective, as well other users usage. In some embodiments, the recommendation model can use an ensemble model that includes collaborative filtering, item-item filtering, and multi-objective optimization. The underlying models use data from various sources, such as from other users interaction with search interface, a user's prior use of the tool, as well as information collected from the candidates, including but not limited to the project in their portfolio, how their project is featured on the web, and information we have gathered from past work experience, and both internal and external reviews, and/or the like. Recommendations can be specific to a job industry and/or a job segment (e.g., that is being used by an agent). The machine learning recommendation engine may provide talent recommendations to a user (e.g., an employer) based on usage history of the user. For example, the system may provide talent recommendations to the user by displaying visual works of one or more talents recommended for the user in a user interface of the system (e.g., in a recommended talent section).

The display component 108 can be configured to display, to a user (e.g., to a member of an organization, a recruiter, and/or the like), a series of user interfaces used to search for visual candidates. For example, the display component 108 can be configured to generate various user interfaces discussed further herein, including in conjunction with FIGS. 6-11 and Appendix A.

Figure 2A:
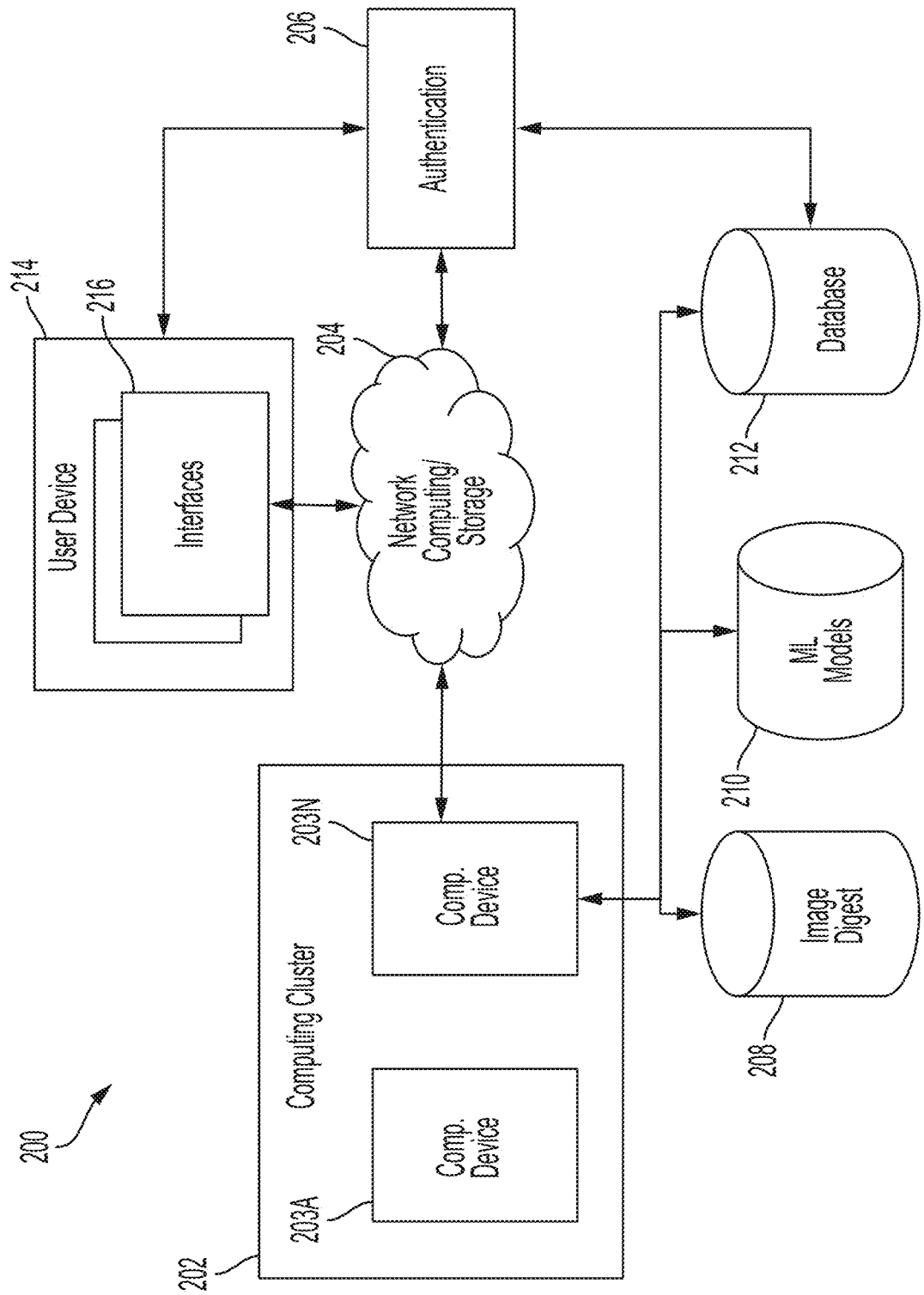
FIG. 2A is a system diagram showing a system for providing a visual candidate intake and search platform, according to some embodiments.

FIG. 2A is a system diagram showing a system 200 for providing a visual candidate intake and search platform, according to some embodiments. The system 200 includes the computing cluster 202 with computing resources or devices 203A through 203N, network computing/storage 204, an authentication component 206, an image digest 208 (e.g., used to search the data in the system, as described further herein), ML models persisted to external storage 210, and an additional database 212 (e.g., used to store data associated with images, labels and confidences, etc., as described further herein). In some embodiments, the image digest 208 may include one or more search indexes that are used for searching for talents and/or work of talents. User device(s) 214 can communicate with the system to obtain and interact with the system through the various user interfaces 216 discussed further herein. The various components can be in communication over one or more communication networks, such as a local area network (LAN), a wide area network (WAN), the Internet, a cellular network, and/or some combination thereof.

Figure 2B:
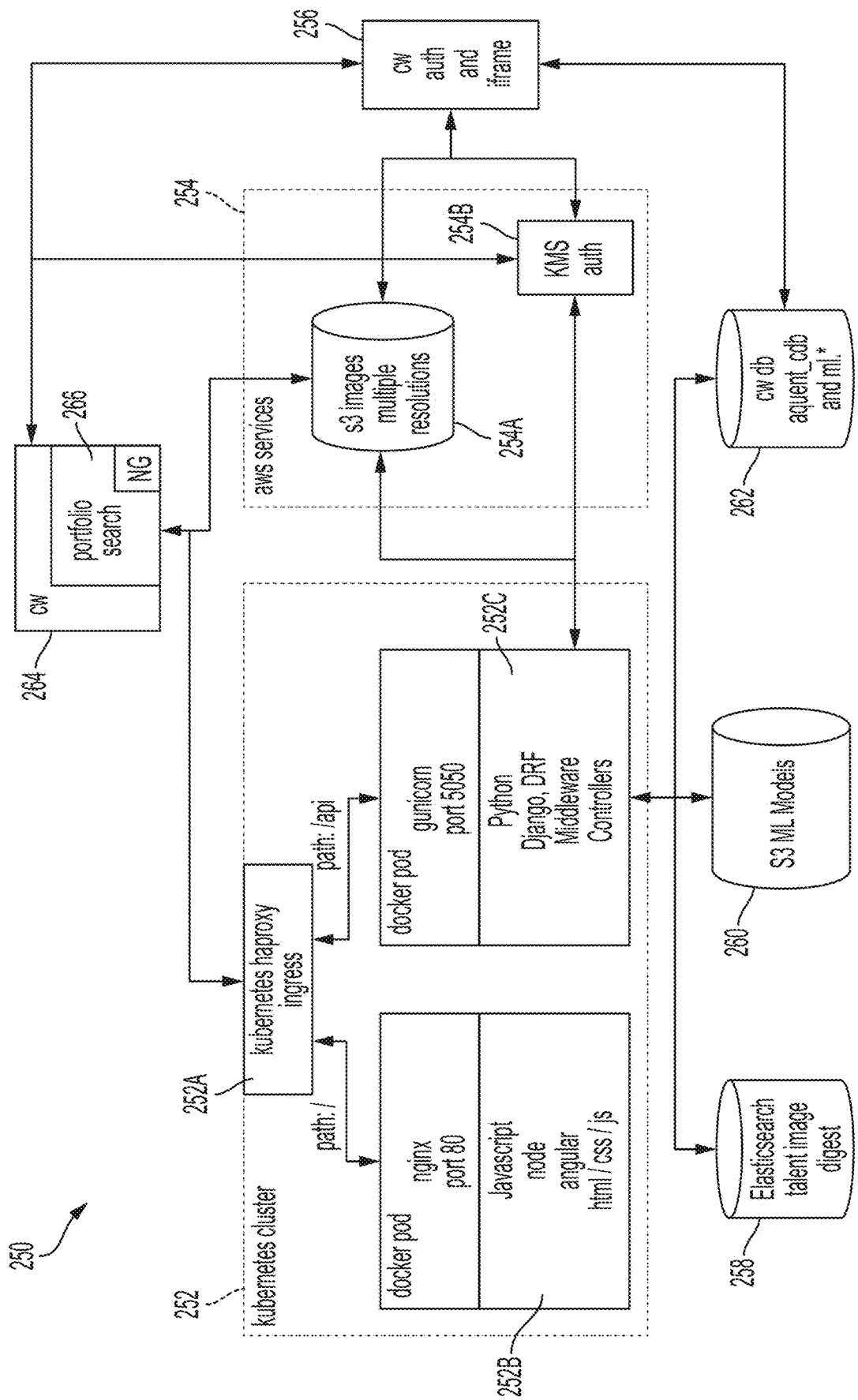
FIG. 2B is an exemplary detailed system diagram showing an implementation of the system in FIG. 2A, according to some embodiments.

FIG. 2B is an exemplary detailed system diagram 250 showing an implementation of the system 200 in FIG. 2A, according to some embodiments. System 250 includes a Kubernetes cluster 252 for managing multiple docker pods 252B, 252C. The Kubernetes cluster includes a Kubernetes haproxy ingress 252A configured to control traffic to the docker pods 252B, 252C. The docker pods 252B, 252C may each be configured to run containerized application(s) in the docker pod. For example, as shown in FIG. 2B, the docker pod 252B executes JavaScript while the docker pod 252B executes Python. The system 250 includes an amazon web services network storage 254 including a datastore 254A for storing images. In some embodiments, the datastore 254A may store each image at multiple resolutions. The network storage 254 includes an authentication component 254B for managing access to the datastore 254A. In some embodiments, the authentication component 254B may manage multiple different roles, and grant permission to the datastore 254A according to a role of an authenticated user. For example, a first role may only have permissions to read data, while a second role may be an admin role with permissions to read, add, delete, and modify data. The system includes an authentication component 256. The authentication component 256 may authenticate users of the system 250. For example, a user accessing the system from a client device 264 may be authenticated (e.g., from a username and password) by the authentication component 256.

As shown in FIG. 2B, a user device 264 (e.g., laptop, and/or smart phone) may be used to access the system 250 by a user. The user device 264 may display a user interface 266 through which the user may interact with the system 250. For example, the user interface 266 may display a search interface for searching for talent and/or visual works created by talents. Example user interfaces and search techniques are described herein.

As shown in FIG. 2B, the system 250 includes a talent image digest data store 258. In some embodiments, the system may store information used for searches. In some embodiments, the datastore 258 may store a search index used for searching for images of visual works created by talents. The search index may include images along with respective labels (e.g., obtained from classification, object detection, and/or associated text). The search index may further include, for each image, information about a talent that created the image.

In some embodiments, the datastore 258 may store multiple search indexes for searching for images of visual works created by talents. In one implementation, a first search index may be an aggregate of image labels and associated text. In the first search index, a set of images that most closely associate with each label (e.g., determined from machine learning models) are indexed along with associated text, and talent information (e.g., work history and job titles). For example, the first search index may include the one, two three, four, five, six, seven, eight, nine, or ten images that most closely associate with each label stored in the first index. In some embodiments, the system 250 may determine the images that most closely associate with a label based on confidence scores of images relative to the label. The confidence scores may be obtained during classification and/or object detection for the image. The system 250 may identify a number (e.g., three) of images with the highest confidence score for a label, and store the identified images in the first search index. The first search index may further include information about a talent that created each of the images in the index. The first search index may be used for identifying and/or ordering talents for a search result. A second search index may be an aggregate of image labels (e.g., obtained from image classification, object detection, and/or associated text). The second index may include all images associated with each label along with associated text, and information about a talent that created the image. The second search index may be used to order images displayed for each talent returned in the search results. For example, the images may be ordered based on how closely labels associated with the images match a search query.

As shown in FIG. 2B, the system 250 includes a machine learning datastore 260. The datastore 260 may store parameters for one or more machine learning models used by the system 250. For example, the system may store weight parameters for a neural network used by the system. In some embodiments, the system 250 may store parameters of trained machine learning models in the machine learning datastore 260. As shown in FIG. 2B, the system 250 includes a datastore 262 for storing information associated with images. In some embodiments, the system 250 may store information determined for the images in the datastore 262. For example, the system 250 may store tags and labels determined for images (e.g., from classification and object identification) in the data store 262. The system 200 will be described in conjunction with FIG. 3, which is a flow chart showing an exemplary computerized method 300 for processing candidate images for the system, according to some embodiments. At step 302, the system 200 authorizes a candidate to use the system using the authorization component 206. Authorization can be integrated with other systems using a single secure login point. At step 304, the system 200 can receive images that are uploaded by the candidate (e.g., along with an associated description) and/or receive one or more URLs from the candidate.

At step 306, if the candidate provided one or more portfolio URLs, the system 200 can scrape the URLs for text associated with images and pages and store the images themselves in the network computing/storage 204. In some embodiments, the system may obtain text associated with images. For example, the system may obtain text associated with an image on a website from which the image is obtained. The system may use the obtained text to determine one or more labels associated with the image.

At step 308, the system 200 can use the network computing and storage 204 to classify the images using machine learning models stored in the ML model database 210 and persist the labels. The system 200 can also use the network computing and storage 204 to perform object detection on these images using machine learning and persist such data. In some embodiments, the system may perform object detection on the images in addition to or instead of classifying the images. The system may perform object detection using a machine learning model. The system may determine one or more labels based on results of the object detection.

At step 310, in some embodiments, the techniques can be configured to organize images scraped from the same web page into projects within the candidate's portfolio. At step 312, the persisted image label data, along with talent information, is uploaded to the image digest 208 (e.g., a Lucene Search Index, such as Elasticsearch (ES)). The index can allow the system 200 to return results quickly (e.g., in under 1 second), and either search for images or associated text, as well as filtering by talent requirements. In some embodiments, the image label data may include confidence scores for one or more labels of each image. The confidence scores may be used for performing searches. For example, the confidence scores may be used to perform a search in process 2200 described herein with reference to FIG. 22 and process 2300 described herein with reference to FIG. 23.

In some embodiments, the portfolio search aspects of the system 200 can be created using a microservices framework. The code that calls the image digest can be, for example, written in python and can use the Django Rest Framework. The data can be presented using Angular. The portfolio search aspects can be run as services that are run as pods inside a docker container and use a RESTful API to communicate. As shown in FIG. 2B, in some examples both docker pods can be behind a haproxy ingress that is managed by Kubernetes.

In some embodiments, the images themselves are securely stored in the network computing/storage 204 (e.g., cloud storage) and the system 200 can provide temporary access when the image payload is returned as part of image search results, as part of the talent portfolio data, and/or the like. The system 200 can store multiple copies of the same image at multiple resolutions to provide a performant view, with upwards of thousands of displayed images in the search results. The system 200 may use different resolutions for an image to improve efficiency of the system. For example, the system may use images of a lower resolution in displaying search results in a graphical user interface. The search results may include several images, and thus using low resolution version(s) of the search results may allow the system 200 to retrieve the images and display the results in less time than the system 200 would for high resolution version(s) of the search results.

The inventors discovered and appreciated that pre-trained models for image classification are often built using relatively small images. Such models can be good at, for example, identifying objects within an image. However, when interpreting visual samples of a candidate, it can be desirable to interpret the overall style of the image as a whole, which can include treating the same object in different ways (e.g., depending on the context of the image). A problem with using an image that has been scaled down so that it can be used with pre-trained models (e.g., to 256 by 256 pixels) is that the style of the image, communicated in the full-size image, can be lost. For example, details of a design in a visual work (e.g., font, image shape) may not visualize correctly with an image of low resolution. Yet, using a pretrained model can still be desirable, e.g., since it saves considerable processing time and/or requires far fewer training images.

The inventors have developed techniques for piecemeal data augmentation for image classification using a pre-trained model. Piecemeal data augmentation can allow the system to still use every pixel from the full size image with a pre-trained model. In some embodiments, the techniques can take pieces from the training images while training, pieces from an image that needs to be classified, and/or both. These pieces can include every pixel at least once and no more than a predetermined number of times (e.g., three times, four times, etc.). In some embodiments, pixels closer to the center are more likely to be repeated than other pixels.

Figure 4:
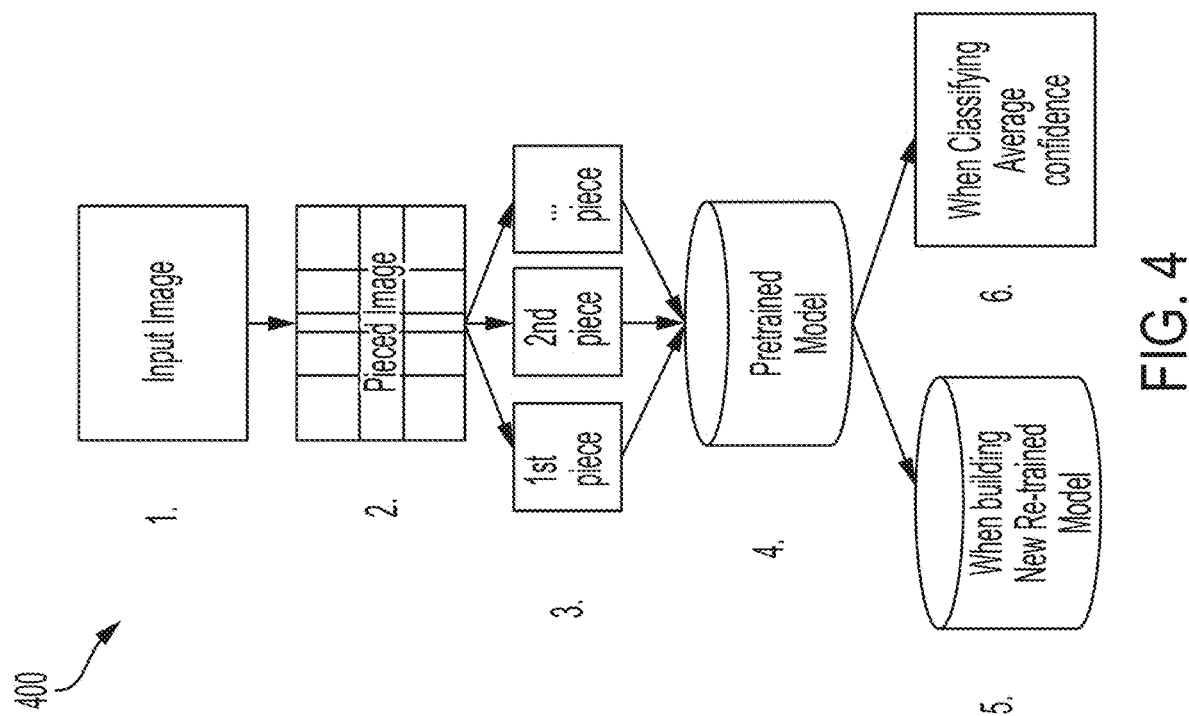
FIG. 4 is a flow chart showing an exemplary process for piecemeal data augmentation, according to some embodiments.

FIG. 4 is a flow chart 400 showing an exemplary process for piecemeal data augmentation, according to some embodiments. At step 1, the piecemeal approach starts by taking a piece of the source image that is the size of images used for the pre-trained model from each corner. While parts of the image have not been gathered the approach will center the next piece it takes on remaining pixels. With most images there will be some overlap of pieces. In some embodiments, no pixels will be omitted. At step 2, images can be cut up piecemeal either as a pre-processing step (e.g., preprocessing data augmentation) or while training (e.g., inline data augmentation). At step 3, piecemeal data augmentation can be used, including alone as the only data augmentation and/or along with other transformations, such as affine transformations. Such a piecemeal approach can be used with different categories of images, such as with all training, validation and/or test images. At step 4, the image pieces (e.g., including the training, validation and test image pieces) can be used to retain the same label as their source image. At step 5, the new re-trained model can then be used for classifying images.

In some embodiments, when an image is to be classified, the image is divided into pieces, such as by using a similar approach to steps 1-4 in FIG. 4. For example, each piece of the image can be classified separately, and at step 6 all separate classifications can be averaged to determine a single classification for the entire source image. In some embodiments, the system may be configured to average classifications of pieces of an image by (1) determining, for each piece, confidence scores for a set of labels; (2) averaging the confidence scores for the set of labels across the pieces; and (3) selecting a label from the set of labels with the highest confidence score as the label for the image. In some embodiments, the system may be configured to store multiple labels for an image. The system may determine multiple labels by identifying a number of labels having the highest confidence scores. For example, the system may store the top two, three, four, five, six, seven, eight, nine, or ten labels associated with the image.

In some embodiments, the system can perform object detection labeling of images (e.g., using Amazon's Rekognition Service). For ease of description, object recognition labels, artifact labels and style labels can be collectively referred to as image labels. As described herein, the various image labels can be persisted to a database, along with their source, type and their associated level of confidence. In some embodiments, the techniques can store text that is associated with an image. As described herein, the text can be received when the talent uploaded the image to the system (e.g., and assigned a title and user story to it), and/or when the system scrapes the image off of a portfolio site, and associated it with related text. As described herein, images that are scraped from the same page, or context, by the web scraper can be grouped together into projects. In some examples, projects may also have other attributes associated with them, including more text.

In some embodiments, the image index is built using data extracted using the techniques described herein. For example, the image labels and associated text, project information, and candidate information can be flattened into a single record for each image, and used to build the image index (e.g., the Elasticsearch Image Index, as described herein). In some embodiments, system may be configured to store label information for each image in the index. The label information may indicate information about one or more labels associated with the image in the index. In one implementation, the label information may include a name of the label, a confidence score of the label for the respective image (e.g., obtained from classification and/or object detection), a version of a model used to obtain the label (e.g., classification model), and/or a type of model used to obtain the label (e.g., a type of machine learning model).

Figure 5:
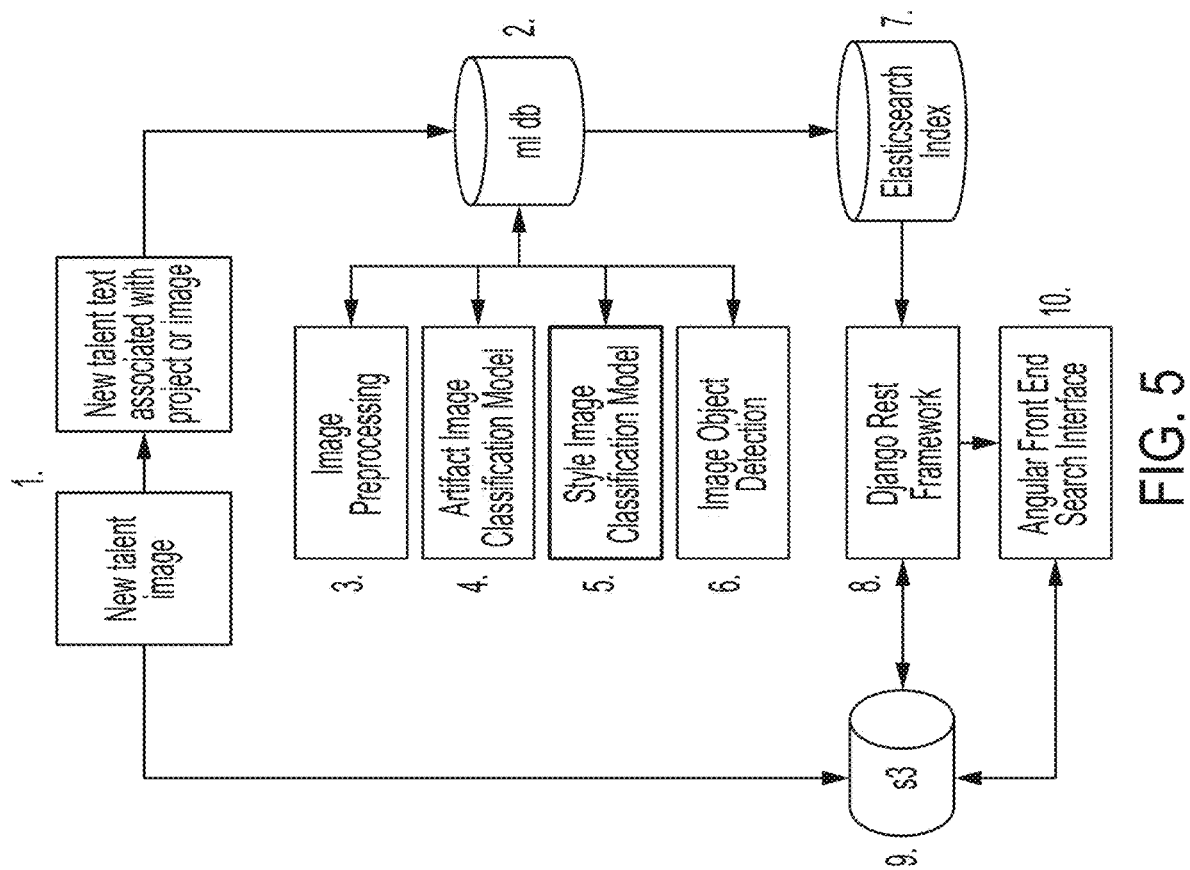
FIG. 5 is a diagram showing an exemplary process for processing a new image, according to some embodiments.

FIG. 5 is a diagram showing an exemplary process 500 for processing a new image, according to some embodiments. At step 1, a new image (e.g., with or without an associated project) and associated text comes into the system. The image can be stored, for example, in a cloud database such as on Amazon S3. At step 2, information associated with this image, like which project, or talent it belongs to is stored in a DB (e.g., the database 212). At step 3, the image is preprocessed. The processing can include, for example, making multiple copies of the image at multiple resolutions. As another example, if the image was originally RGBA it can be converted to RGB. As a further example, the system can compute and store the md5 and dhash8 for the image.

At step 4, the system can label the image (e.g., with an artifact image classification model), and store the associated label and confidence in a DB (e.g., the database 212). At step 5, the system can label the image (e.g., with a style image classification model), and store the associated label and confidence in a DB. At step 6, the system can send the image to a third-party service for object detection and store the associated object label along with its confidence score in a DB. At step 7, the system can flatten image labels, and other image information (e.g., md5, dhash8), along with talent data and upload the data to a search index, such as the Elasticsearch Index. In some embodiments, text associated with an image, applicant and project information can also be stored with each image record in the search index. The text can be used as part of the ranking algorithm, along with image labels and their associated confidence. At step 8, the system framework (e.g., the Django Rest Framework, python service) responds to search requests, and fetches ranked images and their information from the search index. The framework can also deliver search guides to the front end, such as refined aggregations from the index, based on the current query. At step 9, the framework gets a signed URL from s3 for the appropriate size image for display. At step 10, the images are displayed in the front end (e.g., the Angular Front end).

In some embodiments, NLP techniques can be used during the process 500. For example, a machine learning NLP model can be used to identify synonyms and/or similar terms. Such matching can be done for a single term, multiple terms, and/or in combination with guided search terms. Each similar term can be ranked by confidence. As described herein, some examples can include a model that uses a pre-trained model, such as GLOVE, which can be retrofitted to use the terms of relevance for the system. For example, some artifacts that can be used include 3D render, annual reports, billboard(s), book covers, brochure, comic strips (comics), data visualization, display ads, editorial, email, exhibition signage, flowcharts, forms design, icon sets, identity systems, illustration, infographic, interior design, landing pages, logo, menus (menu) museum/exhibit (museum), package design, personas, portrait, poster, presentation slides, resumes, retouching, sheet music, sketch, storyboards, style guides, typography, UI desktop, UI mobile, web eCommerce, website, wireframes, and/or the like. As another example, some styles that can be used include clean, corporate, geometric, glitch, graffiti, isometric, material design, psychedelic, retro, sketch, Victorian, vintage, and/or the like. The unsupervised model can provide the system with, for example, a Word2Vec model that can be used for finding like terms. Using this model, the system can return like terms that have a strong correlation with the search term or terms, but are not synonyms. As also described herein, the system can use a set of mathematical models that can be used to specify a strong correlation. Such models can use various strategies, such as referencing a common term and excluding it from the set which forces an orthogonal term that is closely related, but not a synonym.

In some embodiments, the mathematical models can be used to create search guides. Search guides can be provided from an approximation of the entire search results using aggregation, such as Elasticsearch aggregation. The terms can be separated into categories based on the source model, and ranked based on relevance. In some embodiments, alternate models can be used that include a signal from a recommendation engine for search guides, ranked search results, and/or a signal from Word2Vec NLP orthogonal term matching (or similar pre-trained models, tuned to the system domain as explained above.

The search index can be searched to identify talent to fill visual roles. In some embodiments, when running a search, the system can rank the search results, such as to provide a user with the best-ranked search results first and/or at the top of the results list. The ranking algorithm can use one or more image classification machine learning models to label images, either alone and/or in combination (e.g., such as using two different models). For example, one image classifier can be an artifact model that is specifically built to surface marketing artifacts that our design talent create. The model can use domain-specific knowledge to provide high value both with search results and with search guides. For an illustrative example not intended to be limiting, the model can use a pre-trained Mobilnet 224 v 1.0 model as a base model. The softmax layer can be replaced with the image labels to train for the system. As another example, the model (e.g., a second model) can be used for analyzing artistic and creative style. As an illustrative example not intended to be limiting, the model can use a pre-trained VGG16 model built on ImageNet. This style model can rebuild the last 4 layers, in addition to the softmax layer.

When processing a search query, the system can process search text to see if it shares a root term with one of the current image labels. In some embodiments, such matching can handle plurals and variants, as well as multiple word terms (e.g., such as "package design"). The system can then query the index labels and text, using a sum of image labels, and an overall text confidence. If using an Elasticsearch, internally it can use a Levenshtein distance of 2, which can handle some misspellings when determining text confidence. The sum of the image label confidence and text confidence can then be used for ranking on pages where search text or search guides have been supplied. In some embodiments, the system can associate images with candidates, and provide key talent information to allow us to filter by availability, location, desired pay rate, and role within an organization. Such data can be used to filter talent.

In some embodiments, there can be a default ranking provided when no search text or search guides are provided, such as when a user first logs into the system. The default filter can be based on the home market of the user, and active talent. The ranking algorithm can use Gaussian bucketing and a pseudo random key tied to the session for pagination. The Gaussian bucketing can, for example, bucket on location with a decay rate of 0.2 every 10 miles. The Gaussian bucketing can also bucket the last active date using a decay rate of 0.5 every 30 days. When an availability status is provided by filters, the availability status can override the last active Gaussian ranking. When a location filter is provided, it can override the location Gaussian ranking. The pseudo random bucketing can remain in effect until a search term or search guide is provided.

Figure 22:
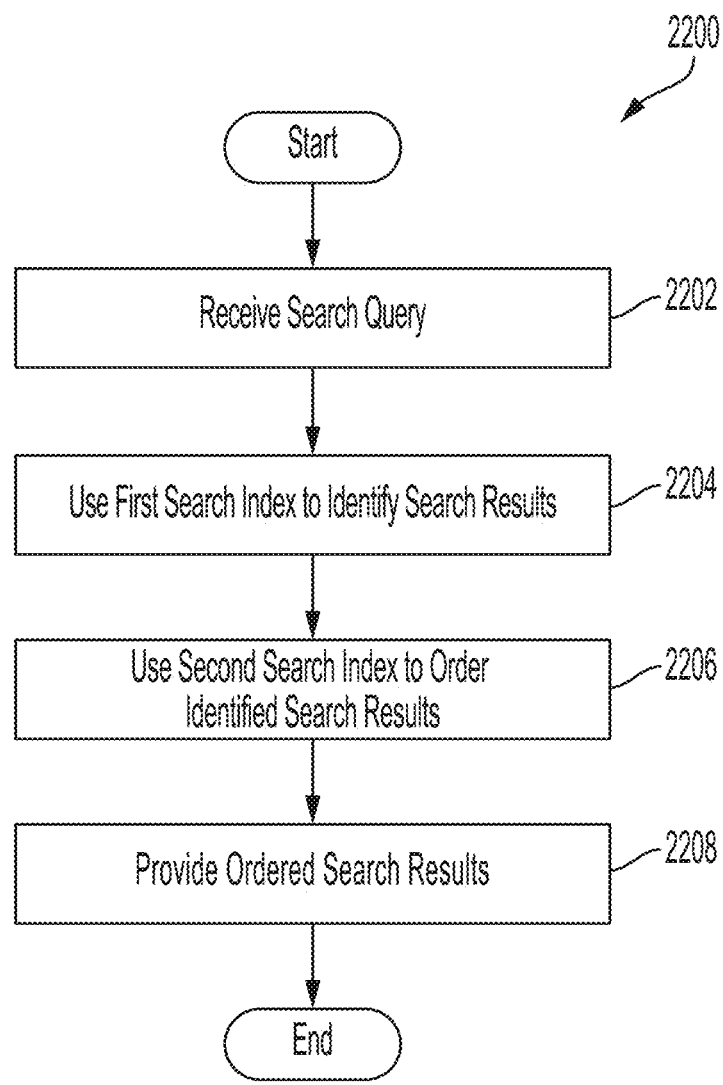
FIG. 22 is a flow chart of an exemplary process for performing a talent search, according to some embodiments.

FIG. 22 shows a flow chart of an exemplary process 2200 for performing a search, according to some embodiments. Process 200 may be performed by computing system 100 described herein with reference to FIG. 1.

Process 2200 begins at block 2202 where the system receives data indicative of a search request. In some embodiments, the data indicative of the search request may be text submitted by a user in a user interface provided by the system. For example, the system may receive a textual search query after a user selects a GUI element to submit text entered into a field of the user interface (e.g., a search field) provided by the system. In some embodiments, the data indicative of the search request may comprise an image (e.g., an image file). For example, the user may upload an image file as part of a search request (e.g., to obtain search results of images similar to the uploaded image).

In some embodiments, the system may provide recommended search text to a user. For example, the system may provide recommended text to complete a portion of search text being entered by a user into a search field. The system may include a recommendation engine. The recommendation engine may determine recommendations based on roles the user has filled, past searches, and/or successful searches performed by other users.

Next, process 2200 proceeds to block 2204 where the system uses a first index to identify search results. In some embodiments, the first index may be a talent index which aggregates all image labels and associated text. The system may use the first index to identify search results by (1) identifying labels matching the search request (e.g., by matching search text to text associated with the labels); and (2) identifying talent information (e.g., name, work history, job title) for each of the set of images. In some embodiments, the first search index may include the set of images that most closely associate with the label and/or associated text (e.g., determined from machine learning model outputs). For example, the set of images stored for a label may be the one, two, three, four, five, six, seven, eight, nine, or ten images that have the highest confidence score(s) for the label. In some embodiments, the set of images may be all images that are associated with the label.

Figure 17A:
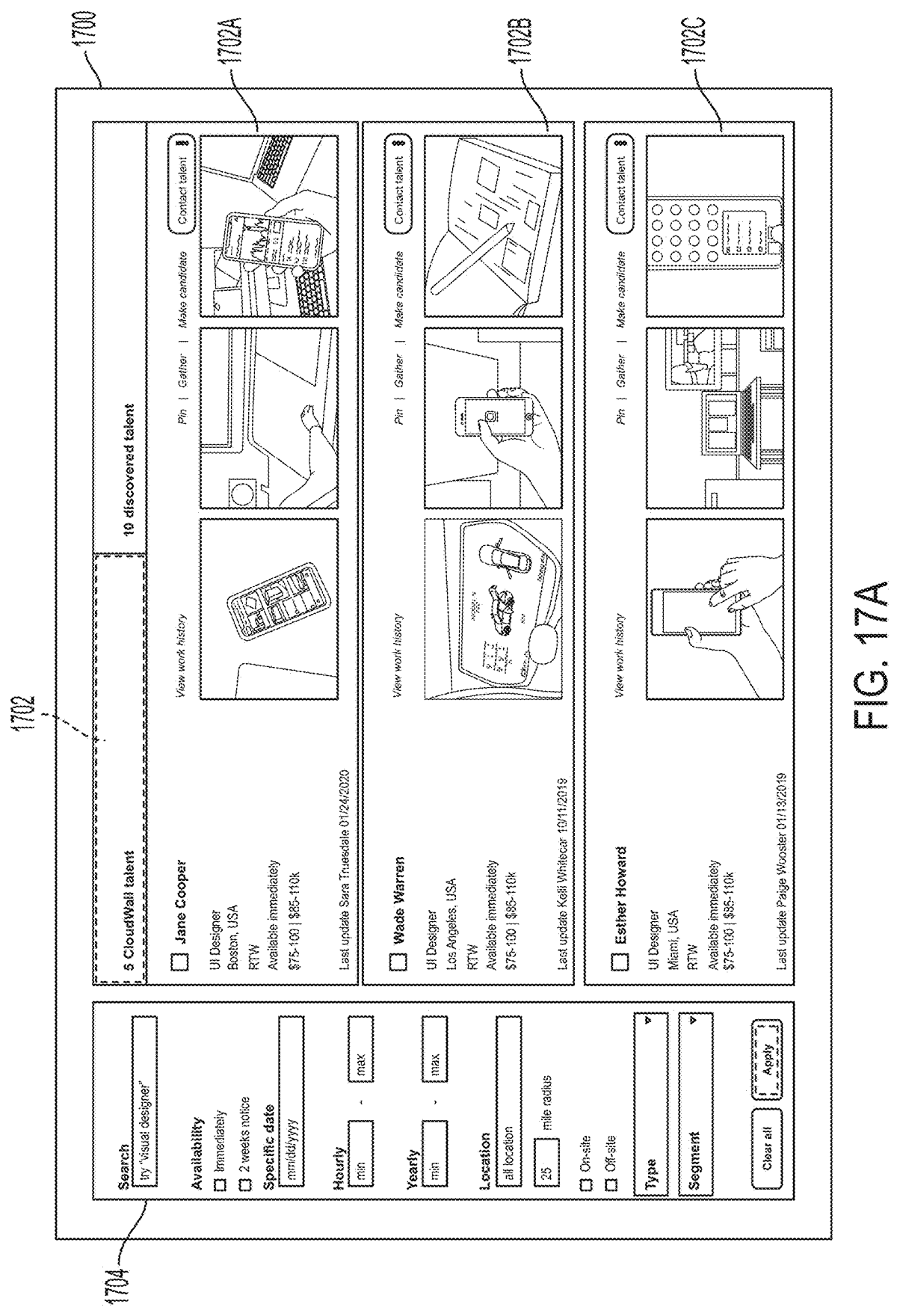
Figure 17B:
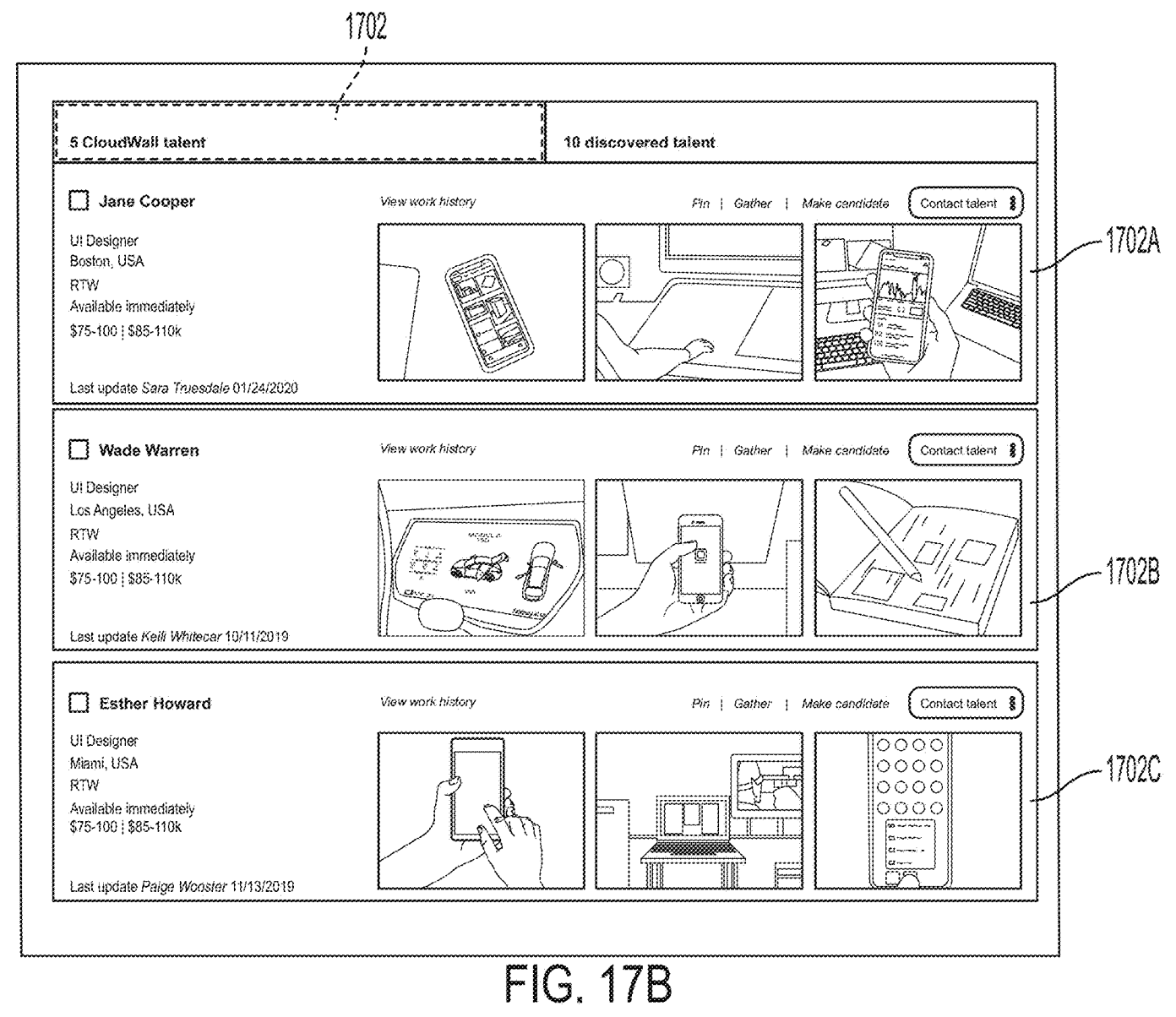
Figure 17C:
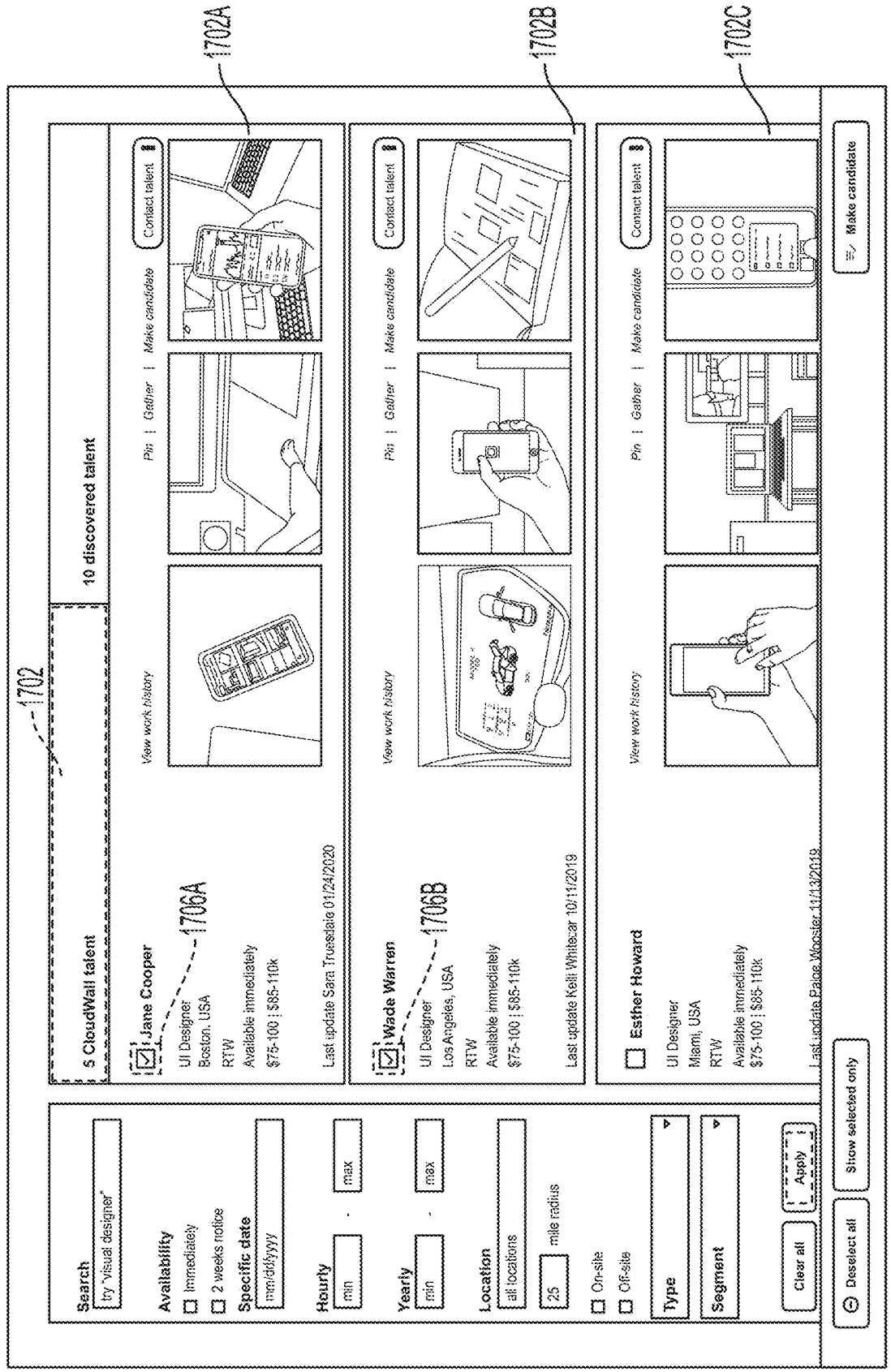

Next, process 2200 proceeds to block 2206 where the system uses a second search index to order identified search results. In some embodiments, the system may be configured to determine the talents that created each of the images identified at block 2204. The system may return multiple images for each determined talent. For each determined talent, the system may use the second search index to determine an order in which to display visual works (e.g., images) created by the talent in the search results (e.g., in a talent card displayed for the talent as shown in FIGS. 17A-C). The system may use the second search index to determine which of the talent's images best match the search request. The system may use the second index to identify an order by (1) determining a measure of similarity between each of the identified images of the talent and the data indicative of the search request; and (2) order the images created by the talent according to the determined measurements of similarity. In some embodiments, the second search index may include, for each image, text associated with the image, one or more image labels, confidence scores for each label, and information about the talent that created the image.

Figure 13A:
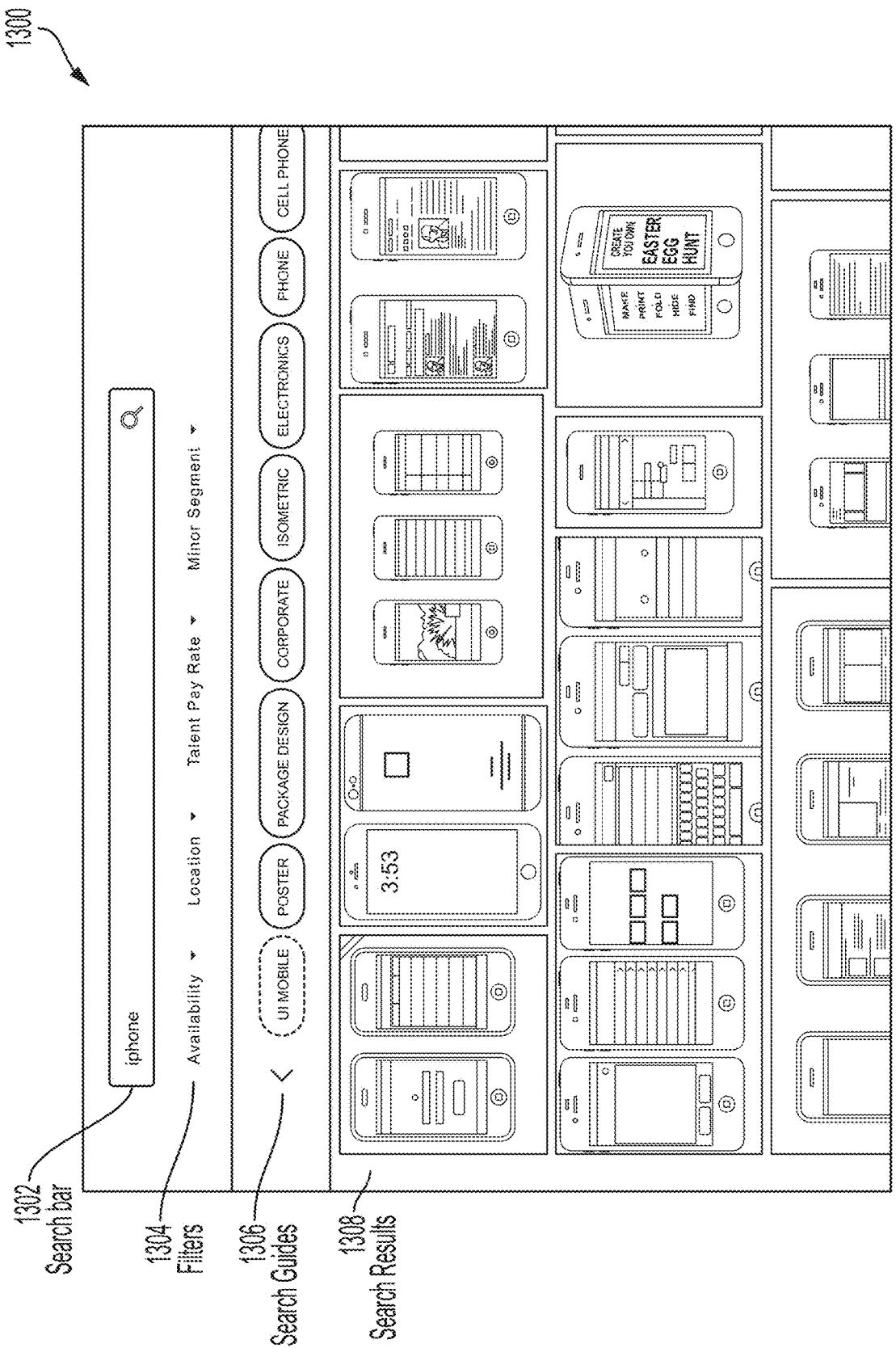
FIGS. 13A-C show views of an exemplary talent search user interface, according to some embodiments.
Figure 13B:
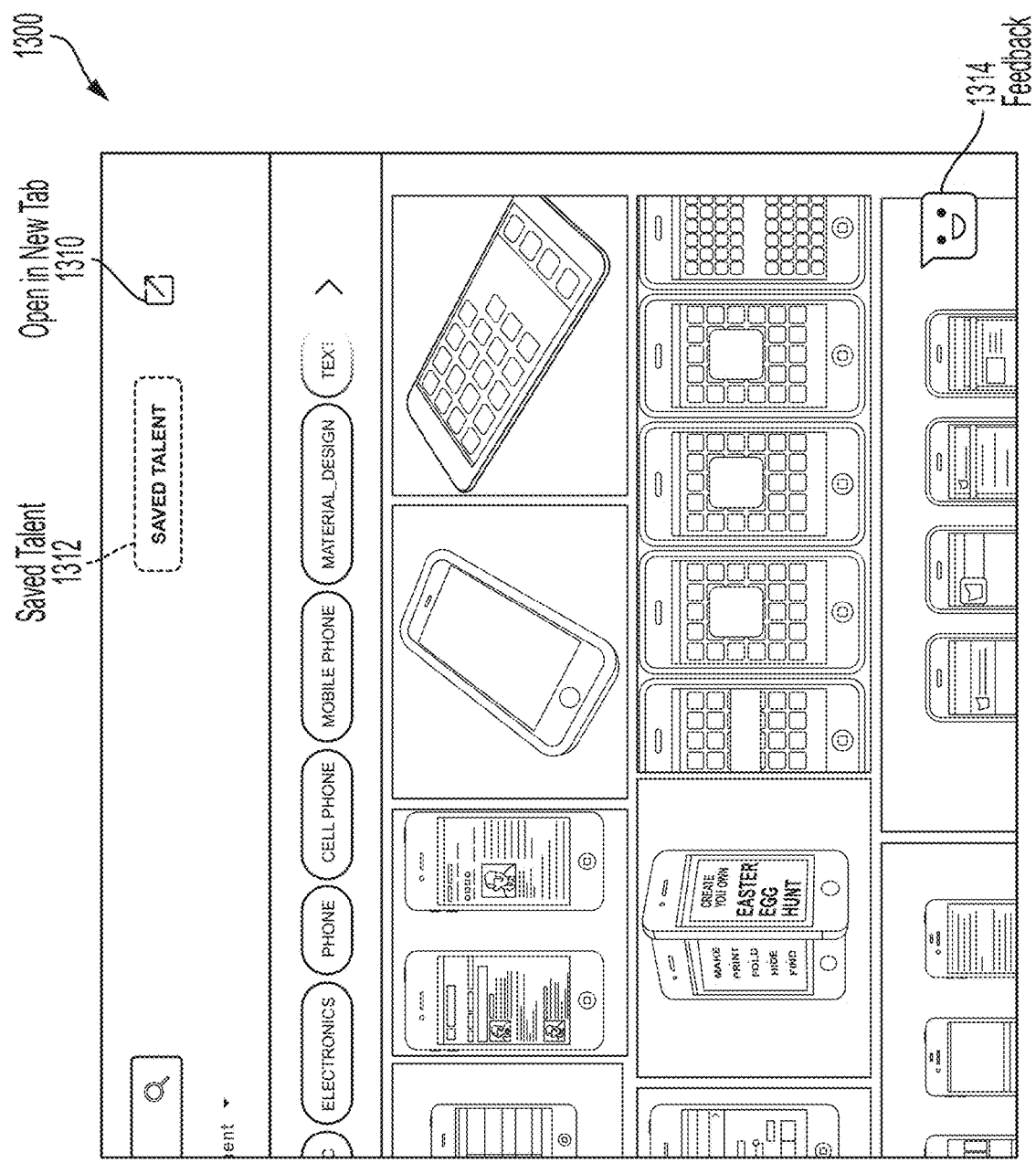
Figure 13C:
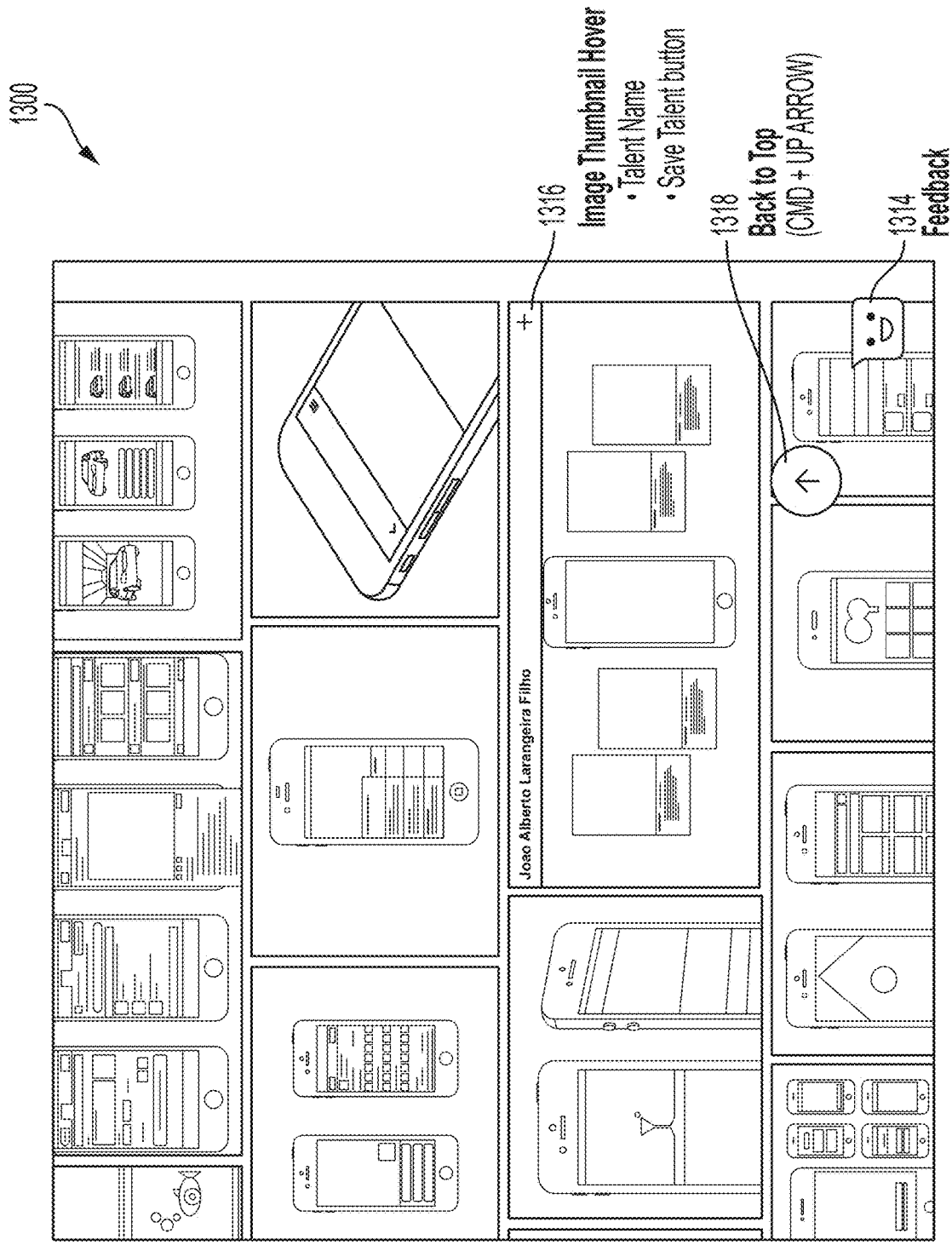

Next, process 2200 proceeds to block 2208 where the system provides ordered search results. In some embodiments, the system may be configured to provide the ordered search results in a display of a graphical user interface. In some embodiments, the system may be configured to provide the results as an ordered set of images (e.g., as shown in FIGS. 13A-C). In some embodiments, the system may be configured to provide the results as one or more talents, and images created by the talents (e.g., as shown in FIGS. 17A-C). For example, the system may provide the results as one or more talent cards, where each talent card shows visual works created by a talent matching the data indicative of the search request (e.g., determined at block 2204). For each talent, the images may be ordered according to the order determined at block 2206. Each talent card may show information about the talent including a title, a location, a salary range, and/or work history.

In some embodiments, the system may hide talent that the user has indicated that the user is not interested in. For example, the system may remove one or more images from a set of results where the image(s) are visual work created by a talent that the user has indicated that the user is not interested in.

Figure 23:
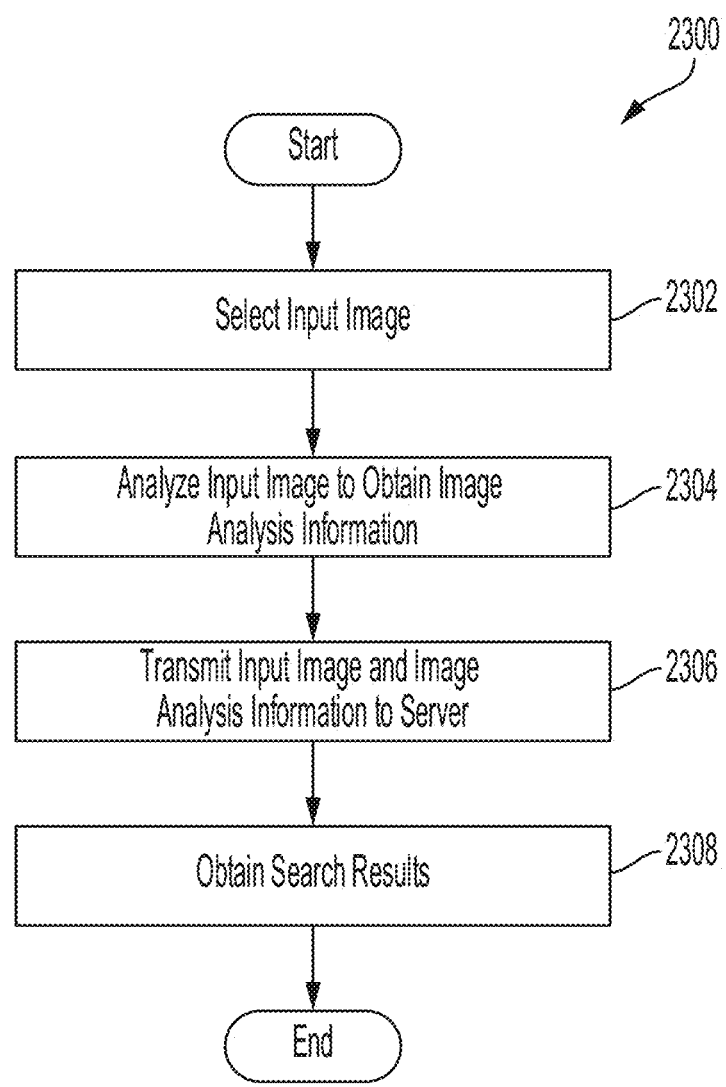
FIG. 23 is a flow chart of an exemplary process for obtaining image search results, according to some embodiments.

FIG. 23 shows a flow chart of an exemplary process 2300 for obtaining image search results. Process 2300 may be performed by computing system 100 described herein with reference to FIG. 1. Process 2300 may be performed to obtain visual works that are similar to an input image provided by a user.

Process 2300 begins at block 2302 where the system obtains an input image. In some embodiments, the system may be configured to obtain an input image from an image file stored on the system. For example, a user may indicate a file to be submitted for the search from a file explorer.

In another example, the image may be uploaded to a location (e.g., a website) through a communication network (e.g., the Internet). The input image may be a photo captured by a camera, a visual work, a downloaded image, or any other type of image. In some embodiments, the system may obtain the input image through an Internet browser application. For example, the system may provide a website in the Internet browser application through which the input image can be submitted.

Next, process 2300 proceeds to block 2304 where the system analyzes the input image to obtain information about the image (referred to herein as "image analysis information"). In some embodiments, the system analyzes the image by performing image processing on the input image to perform image palette and principle color analysis. The system may extract colors and/or other features of the image from the image processing. For example, the system may perform image palette and principle color analysis on the input image to determine a color palette of the input image.

In some embodiments, the system may scale down the input image to obtain a scaled input image. The size of the scaled input image may be less than the original input image. In some embodiments, the system may scale down the image by reducing the number of pixels in the image to reduce a resolution of the image. In some embodiments, the system may convert the image to grayscale. In some embodiments, the system may (1) scale down the image; and (2) convert the input image to a grayscale image. In some embodiments, the system may analyze the input image by executing software code in an Internet browser application. For example, the system may execute JavaScript code in an Internet browser application to generate the image analysis information.

In some embodiments, the system may display results of the analysis to a user. For example, the system may display a scaled version of the image and extracted colors in a user interface display. In another example, the system may display a grayscale version of the input image in a user interface display.

Figure 24:
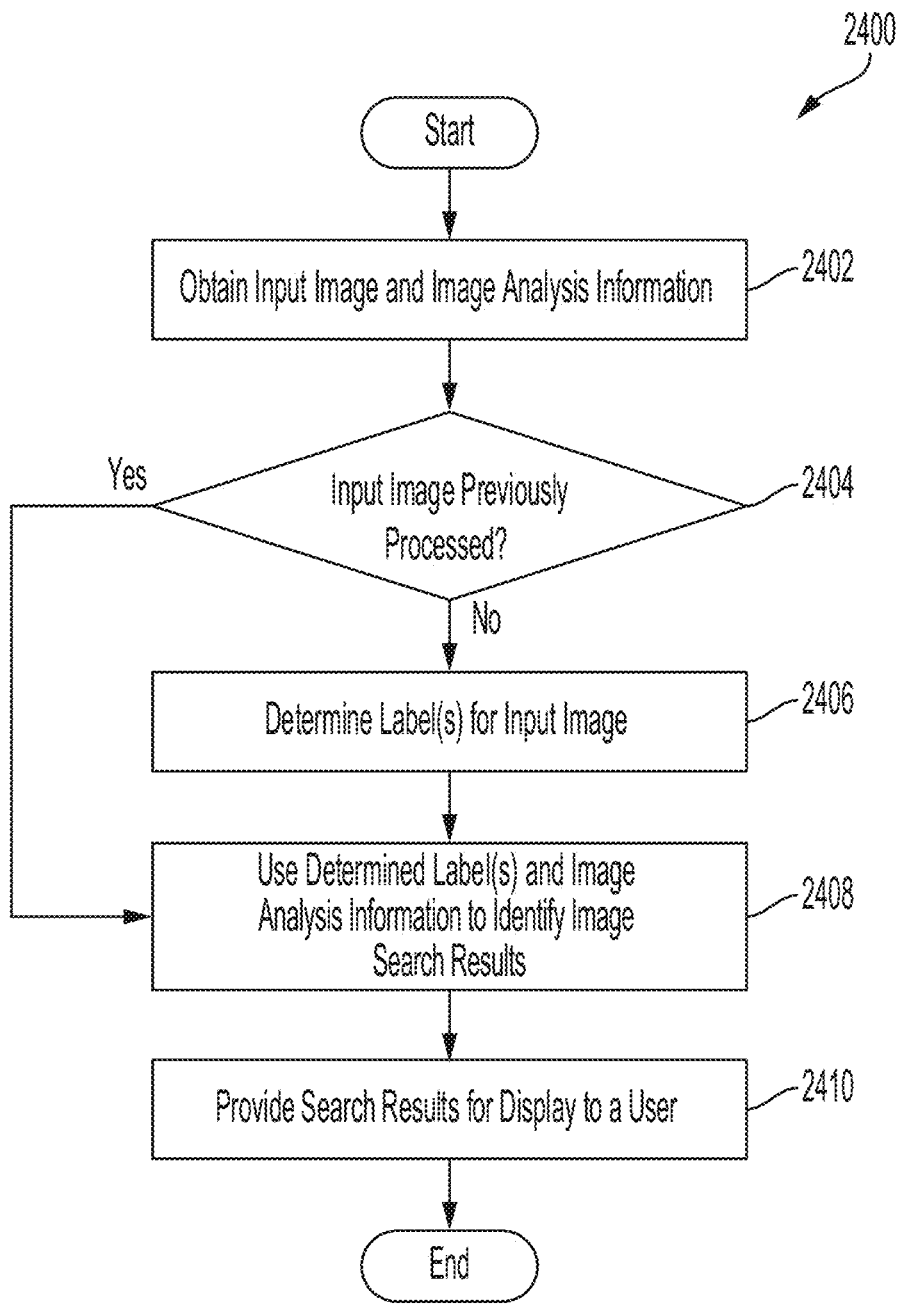
FIG. 24 is a flow chart of an exemplary process for performing an image search, according to some embodiments.

Next, process 2300 proceeds to block 2306 where the system transmits the input image and image analysis information to a server for performing a similar image search (e.g., as described herein with reference to FIG. 24). In some embodiments, the system may transmit the input image and the image analysis information to the server through a communication network (e.g., the Internet). For example, the system may upload files including the input image and analysis information to a storage of the server to allow the server to use the uploaded files to perform the similar image search. In some embodiments, the analysis information may include a scaled version of the input image and/or a grayscale version of the input image. The image analysis information, scaled input image, and/or grayscale input image may be used by the server to perform a search of images similar to the input image.

Next, process 2300 proceeds to block 2308 where the system obtains the search results. The system may receive search results from the server after (e.g., in response to) submitting the input image and analysis information. The system may display the search results in a user interface (e.g., in which the user submitted the input image). For example, the system may display an array of images received from the server based on the input image provided to the server. The system may provide the user with a user interface in which the user may navigate the image search results. For example, the system may provide an interface in which a user can scroll through image results provided by the server. In some embodiments, search results may be displayed in talent cards (e.g., as shown in FIG. 17A-C), where each talent card displays one or more visual works created by a respective talent.

After obtaining the image search results at block 2308, process 2300 ends. For example, a user may access one or more of the image results. The images may be displayed in association with talents who created the images. The system may provide information about a talent who created each of the image search results. For example, the system may provide job title, job history, and salary information about the talent that created a respective image.

FIG. 24 shows a flow chart of an exemplary process 2400 for performing an image search. Process 2400 may be performed to search for one or more images that are similar to an input image. Process 2400 may be performed by computing system 100 described herein with reference to FIG. 1.

Process 2400 begins at block 2402 where the system obtains an input image and information obtained from performing analysis of the input image (referred to herein as "image analysis information"). In some embodiments, the system may be configured to obtain the input image and the image analysis information from a computing device separate from the system. For example, the system may be configured to provide a user interface on the computing device through which a user may submit the input image. The system may receive an image submitted through the user interface through a communication network (e.g., the Internet). The image analysis information may be obtained by the computing device (e.g., by performing image palette and principle color analysis on the input image). In some embodiments, the system may obtain the image analysis information by processing the input image. For example, the system may perform image palette and principle color analysis on the input image to obtain image analysis information including a color palette of the input image.

In some embodiments, the system may receive a scaled version of the input image in addition to the input image. The scaled input image may be generated by reducing the size of the input image size by a percentage to obtain the scaled input image. The system may receive the scaled input image from the computing device (e.g., through the Internet). In some embodiments, the system performing process 2400 may generate the scaled input image from the input image. The system may receive the input image and then scale the image (e.g., by reducing the image size by a percentage). In some embodiments, the system may receive a grayscale version of the input image in addition to the input image. The grayscale version of the input image may be obtained by mapping pixel values in the input image to a grayscale pixel value to generate the grayscale version of the input image. In some embodiments, the system may generate a grayscale version of the input image.

Next, process 2400 proceeds to block 2404 where the system determines whether the input image has been previously processed. The system may determine if another image that is the same as the system has previously performed classification and/or object detection on the input image. For example, the system may store a hash value (e.g., md5 hash value) for each image that is processed by the system. The system may determine whether the input image is the same as one that has already been processed by (1) determining a hash value for the input image by applying a hash function (e.g., md5 hash function) to the input image; and (2) determining whether the hash value matches the hash value for an image that has previously been processed. For example, the system may determine a hash value for the input image by applying the md5 message-digest algorithm to the input image to obtain the hash value. The system may determine whether the md5 hash value matches the md5 hash value of an image that has previously been processed by the system.

In some embodiments, the system may additionally or alternatively determine whether the input image has been previously processed by determining whether characteristics of the input image match a previously processed image. In some embodiments, the system may compare characteristics with other images by comparing a scaled version of the image (referred to as "scaled input image") to scaled versions of images that have been previously processed by the system. The system may determine whether (1) the scaled input image in contained within one or more other images; (2) is a cropped portion of another image; (3) is a version of another image with different aspect ratio; and/or (4) is a compressed version of another image. In some embodiments, the system may perform the determination for a subset of images stored by the system to reduce time used in determining whether the input image has previously been processed.

If the system determines at block 2404 that the input image matches an image that has been previously processed, the system references the previously processed image and proceeds to block 2408. The system may use stored information about the input image to determine search results. For example, the system may access stored labels and image analysis information previously determined for the input image to identify image search results as described at block 2408.

If the system determines at block 2404 that the input image does not match an image that has been previously processed, then process 2400 proceeds to block 2406 where the system determines one or more labels for the input image. The system may determine labels for the input image by performing process 300 described herein with reference to FIG. 3, process 400 described herein with reference to FIG. 4, and/or process 500 described herein with reference to FIG. 5. The system may perform image classification and/or object detection using one or more machine learning models to determine the label(s) for the input image.

Next, process 2400 proceeds to block 2408 where the system uses the determined label(s) and image analysis information to identify image search results from among a set of images (e.g., stored by the system). The system may identify the image search results by (1) comparing the determined label(s) to labels (e.g., stored in database 212 and/or image digest 208) associated with the set of images (e.g., determined by performing process 300, 400, and/or 500); and (2) identifying images associated with labels that match the label(s) determined for the input image to be search results. In some embodiments, the system may identify search results based on primary colors of the input image. The system may use a color palette of the input image (e.g., included in the image analysis information obtained at block 2402) to identify images from the set of images that have similar primary colors to the input image. For example, the system may use a tensor flow color space model to compare primary colors from the color palette of the input image to primary colors of images from the set of images. In some embodiments, the system may identify search results by using a shape of a scene in the input image. The system may compare the shape of the scene in the input image to those of the set of images using a spatial envelope (e.g., GIST). The spatial envelope may be a low dimensional representation of a scene that encodes a set of perceptual dimensions (e.g., naturalness, openness, roughness, expansion, ruggedness) that represents the dominant spatial structure of the scene. These perceptual dimensions may be estimated using coarsely localized spectral information from the image. The system may compare a spatial envelope determined for the input image to spatial envelopes of the set of images to identify search results. In some embodiments, the system may identify search results by using a hash of a scaled version and/or gray scale version of the input image. The system may (1) determine a hash value (e.g., dhash value) for the scaled version and/or grayscale version of the input image; and (2) compare the hash value to hash values determined for scaled and/or grayscale versions of the set of images. In some embodiments, the system may identify search results by using a textual scene description of the input image. The system may compare a textual scene description to textual scene descriptions of images from the set of images. In one implementation, the system compares the scene description of the input image to images from the set of images that have label(s) matching label(s) determined for the input image.

In some embodiments, one or more of the techniques described herein may be combined to identify search results. Each of the technique(s) may be used to generate a respective signal that is incorporated into a model. In some embodiments, the signal(s) may be incorporated into an elasticsearch query. For example, the system may determine signals from label comparison, primary color comparison, scene shape comparison, comparison of hash values, and/or comparison of scene descriptions. The system may then use the signal(s) to identify images. In some embodiments, the system may use each signal as an input to a mathematical formula to determine a value for each of the set of images. The system may then identify search results based on values determined for the set of images. For example, the system may identify images from the set of images having a value greater than a threshold value as a search result. In another example, the system may rank images from the set of images based on determined values and identify a top number of images to be the results. In some embodiments, the system may identify a subset of the set of images using a first set of factors, and perform scale invariant comparison of the input image to images in the identified subset to identify search results. In some embodiments, the system may use primary colors, spatial envelope, hash value, and metadata to identify the subset of images. The metadata may include exchangeable image file (EXIF) data, URL, and/or filename. The system may perform scale invariant comparison of the input image to the images of the identified subset of images. The images identified from the scale invariant comparisons may be the search results that are to be provided to a user for display. In some embodiments, the system may perform scale invariant comparison by identifying a portion of an input image to compare to images in the identifies subset. The system may select a portion to ensure that images are not determined to be different due to image scaling and/or compression effects. For example, the system may use a 500×500 pixel portion of a 1024×1024 pixel input image for comparison to images in the identified subset.

Next, process 2400 proceeds to block 2410 where the system provides search results for display to a user. In some embodiments, the system may transmit the identified search results to a computing device of the user (e.g., through which the user submitted the input image). The system may generate a graphical user interface displaying the identified images. For example, the system may generate the search results interface 1700 described herein with reference to FIG. 17. The search results may be displayed to the user in a user interface of an application on a computing device used by the user. For example, the system may present the image search results in one or more webpages of an Internet website.

After providing the search results for display to the user, process 2400 ends.

Figure 25:
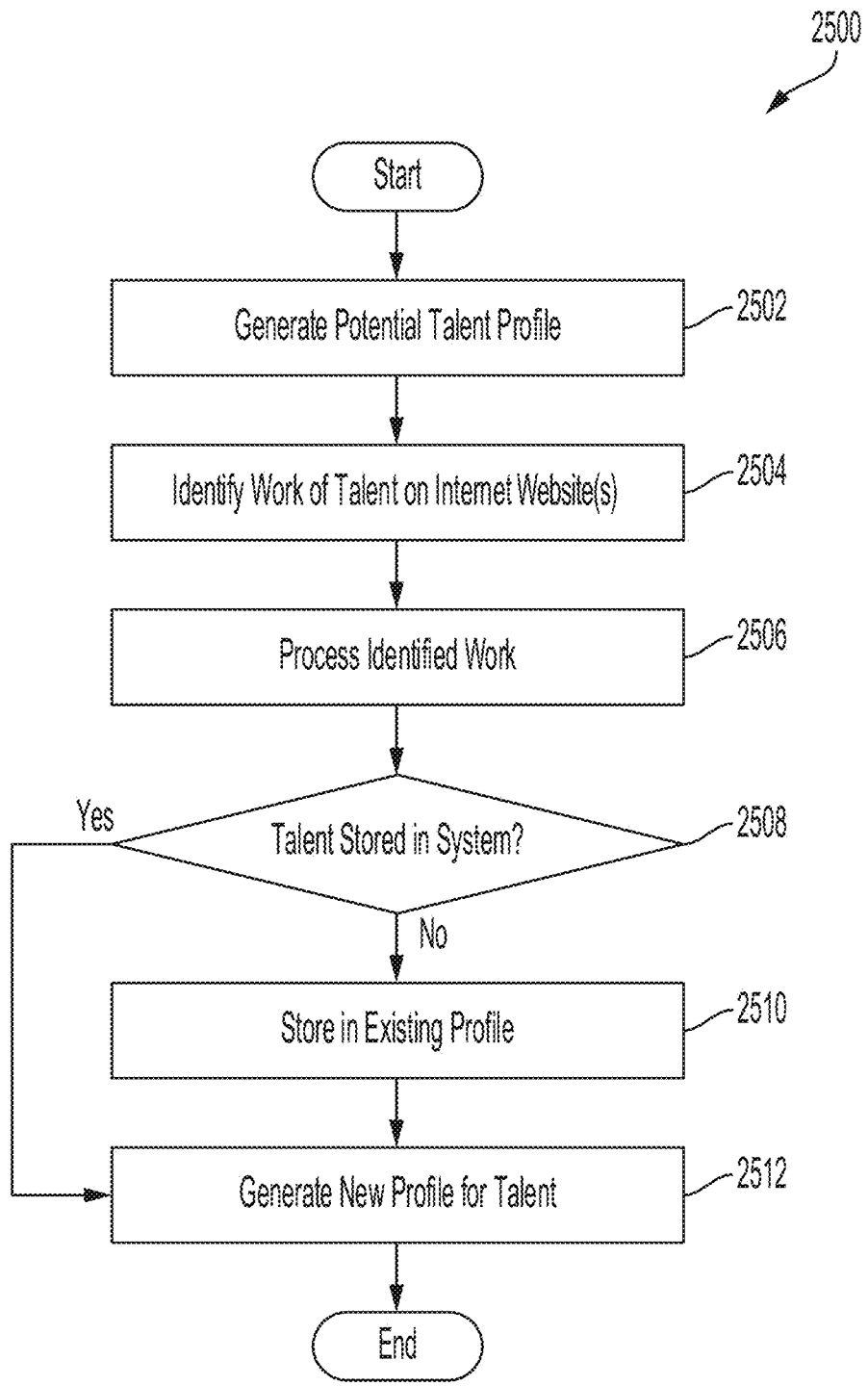
FIG. 25 is a flow chart of an exemplary process for discovering talent work, according to some embodiments.

FIG. 25 is a flow chart of an exemplary process 2500 for discovering talent work, according to some embodiments. Process 2500 may be performed to crawl across Internet websites to discover talents and/or new visual work by talents. Process 2500 may be performed by computing system 100 described herein with reference to FIG. 1.

Process 2500 begins at block 2502 where the system generates a potential talent profile for a talent whose work the system may identify (e.g., from the Internet). The system may store work created by the talent in association with the potential talent profile. In some embodiments, the potential talent profile may include a unique identification. The system may associate the work to the unique identification.

Next, process 2500 proceeds to block 2504 where the system identifies work of the talent on one or more Internet web sites. In some embodiments, the system uses a web crawling framework that uses search engines to identify work. The system identifies images and textual descriptions of the images from presence of the talent on the Internet. For example, the system may identify a portfolio of work for the talent on an Internet website that publishes visual works created by talents. The system may identify work of the talent on the website. In another example, the system may identify a website of the talent that displays visual work created by the talent. The system may identify work from the website of the talent.

Next, process 2500 proceeds to block 2506 where the system processes identified work. The system analyzes a website's web content (e.g., HTML, JavaScript, CSS, and/or images) to determine if the profile and visual work can be correctly attributed to the talent. The system may determine whether the website is a website that provides visual work portfolios of talents. For example, the system may filter out content that cannot be attributed to the talent (e.g., job listings, education advertisements, and/or services provided for designers). In some embodiments, the system may classify a website using a machine learning model. The system may generate input to the machine learning model using the website's web content. The system may provide the input to the machine learning model to obtain output a classification of a website. In some embodiments, the textual content may be processed using natural language processing (NLP) techniques. The system may generate tokens from the textual content using NLP techniques and vectorize the tokens (e.g., using TF/IDF or a binary classifier). The system may then use the tokens to generate input for the machine learning model. For example, the system may use the tokens to generate input for a support vector machine, a k-nearest neighbor (KNN) model, a gradient boosting model, and/or a convolutional neural network (CNN) model.

The system may use a classification of a website to determine whether visual work obtained from the website can be properly attributed to an author. For example, the system may determine whether the website is a portfolio website from which visual work created by the talent can be extracted and processed. The system may access information about the talent from the website, and attribute the visual work obtained from the website to the talent with assurance that the obtained visual work is attributable to the talent.

Next, process 2500 proceeds to block 2508 where the system determines whether the talent has already been stored by the system. In some embodiments, the system may identify a name and contact information for the talent. For example, the system may identify the name and contact information for the talent from a portfolio website. The system may use the determined information to determine whether the talent is already stored in the system. For example, the system may use the determined information about the talent to determine if a talent profile has been previously generated and stored in the system. The system may use a machine learning model (e.g., a neural network, and/or a support vector machine) to determine a confidence of information obtained about the talent. In some embodiments, the system may use an output of the machine learning model to determine a confidence score. The system may determine values for features using information from a website such as signals from search engines and portfolio platforms, proper nouns, email addresses, URLs, host names, image meta data, and/or optical character recognition results.

If the system determines that the talent has already been stored by the system at block 2508, then process 2500 proceeds to block 2510 where the system stores the identified work of the talent in association with the existing talent profile. For example, the system may add one or more images identified as visual work created by the talent in a database. The system may store the image(s) in association with a unique identification for the talent.

If the system determines that there is no record of the talent stored by the system, then process 2500 proceeds to block 2512 where the system generates a new profile for the talent. For example, the system may store the potential talent profile generated at block 2502 as a new talent profile in the system. The system may store identified visual work created by the talent in association with the new talent profile. For example, the system may store one or more images created by the talent in association with a unique identification for the talent in a database.

In some embodiments, a new talent discovered during process 2500 may be contacted. The system may store communication history (e.g., emails, SMS text messages, phone conversations, and/or other communications with the new talent). In some embodiments, the system may store the talent profile for the talent when the talent agrees to being submitted as a candidate for a job order. The system may validate information determined about the talent (e.g., from web crawling during process 2500). The system may request missing data (e.g., that was not obtained by the system from web crawling).

After storing the identified visual work at block 2510 or at block 2512, process 2500 ends.

Figure 6:
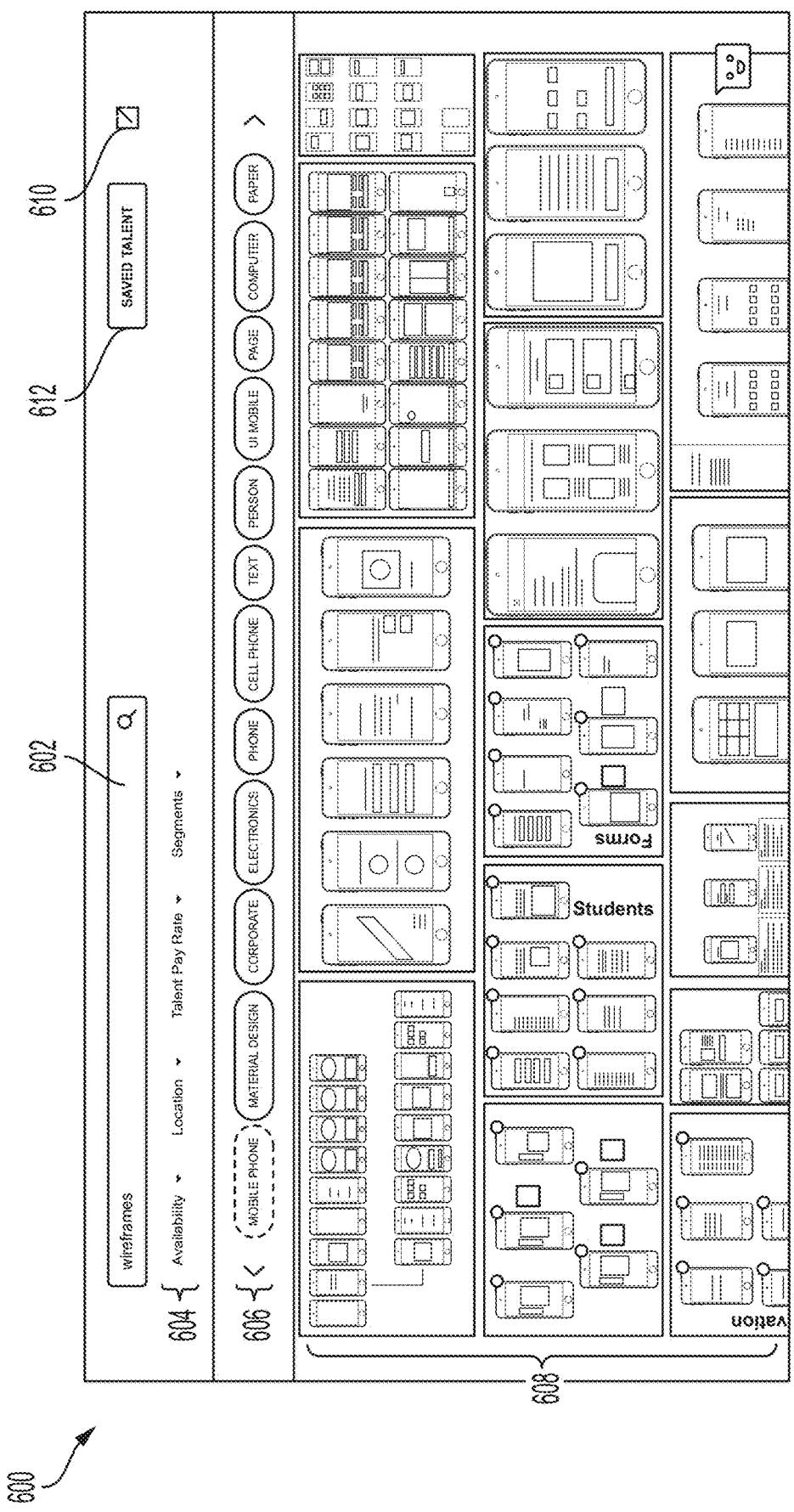
FIG. 6 shows an exemplary portfolio search results page, according to some embodiments.
Figure 7:
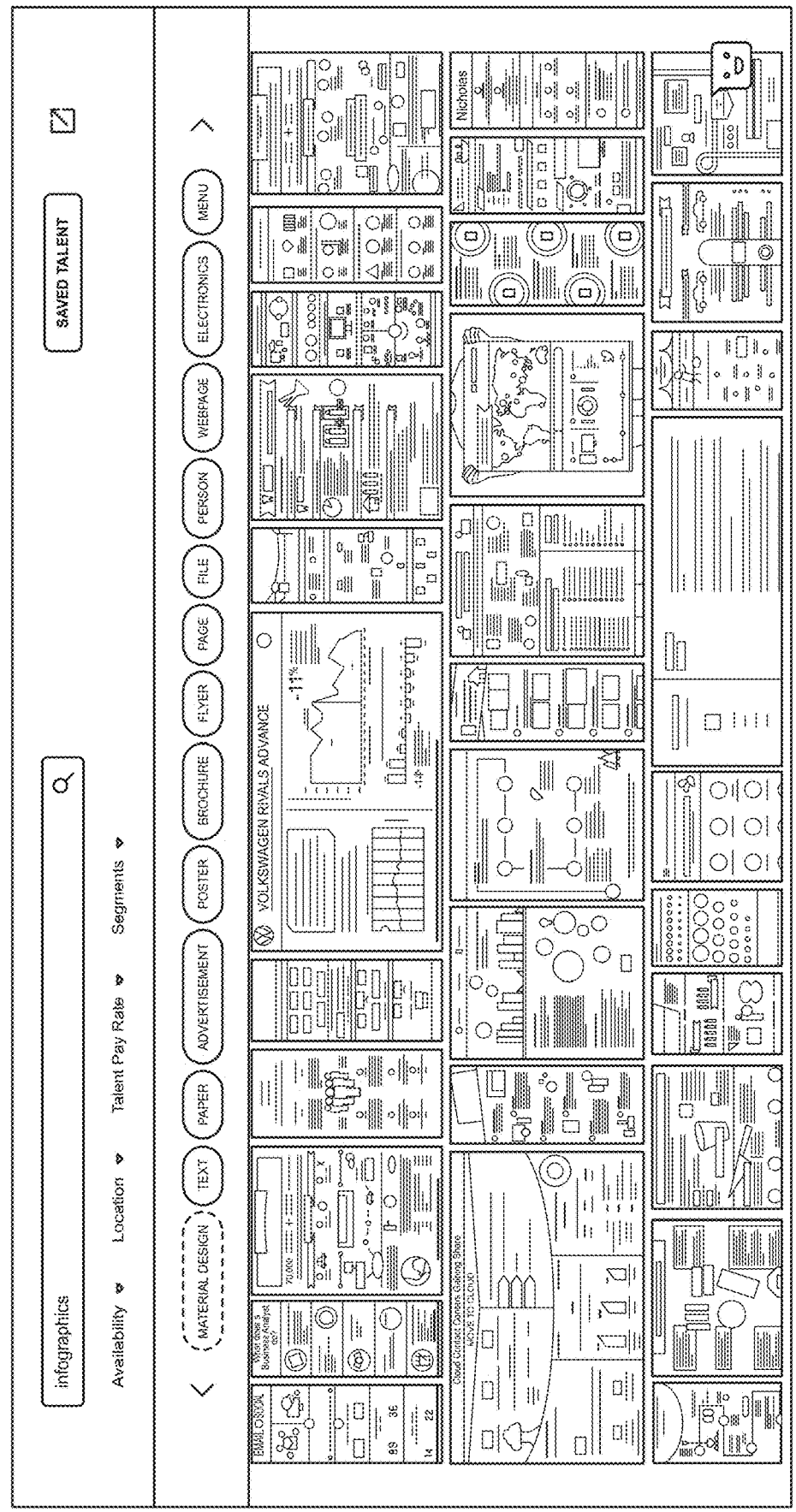
FIG. 7 shows another exemplary search results page, according to some embodiments.

FIGS. 6-11 show graphic depictions of exemplary user interfaces used to facilitate candidate searching, according to some embodiments. In some embodiments, the user interfaces can run as an iFrame (e.g., an iFrame within the context of a main talent sourcing application), in a separate browser tab, and/or the like. FIG. 6 shows an exemplary portfolio search results page 600, according to some embodiments. The search bar 602 shows that the user searched for the term "wireframes." The filters 604 include availability, location, talent pay rate, and segments. The search guides 606 include mobile phone, material design, corporate, etc. The results 608 include candidate images. The user interface also includes a new tab pop out button 610 and a saved talent button 612. FIG. 7 shows another exemplary search results page 700, according to some embodiments.

In some embodiments, the portfolio search user interface is accessible in one of two modes: platform-integrated or standalone. In some embodiments, the platform can be Aquent's CloudWall platform, which is Aquent's internal, proprietary, Web-based "everything" platform including order management, applicant tracking, and candidate sourcing. Upon logging into CloudWall, users can access Portfolio Search from the primary left hand navigation pane. Alternately, by clicking on the new tab pop out button, users may access a Portfolio Search in a dedicated browser tab.

In some embodiments, the portfolio search can be integrated with various business objects and data, which can yield significant value to agent recruiters. Talent portfolio content (e.g., images and text) is extracted from website URLs, classified and labeled, reassembled for viewability, and indexed for search. Talent profile information can also be indexed, allowing for rich searches and effective filtering of Talent based on availability, location, pay rate, or segment (e.g., job type).

In some embodiments, the system can be functionally integrated with orders and talent pools, allowing shortlisted talent via saved talent to be associated as a candidate with one or more specific orders or talent pools. Additionally, or alternatively, for orders with job postings, the system can provide the ability to send an email (e.g., a Gather email) to selected candidates in order to gauge their interest and availability directly.

Figure 8:
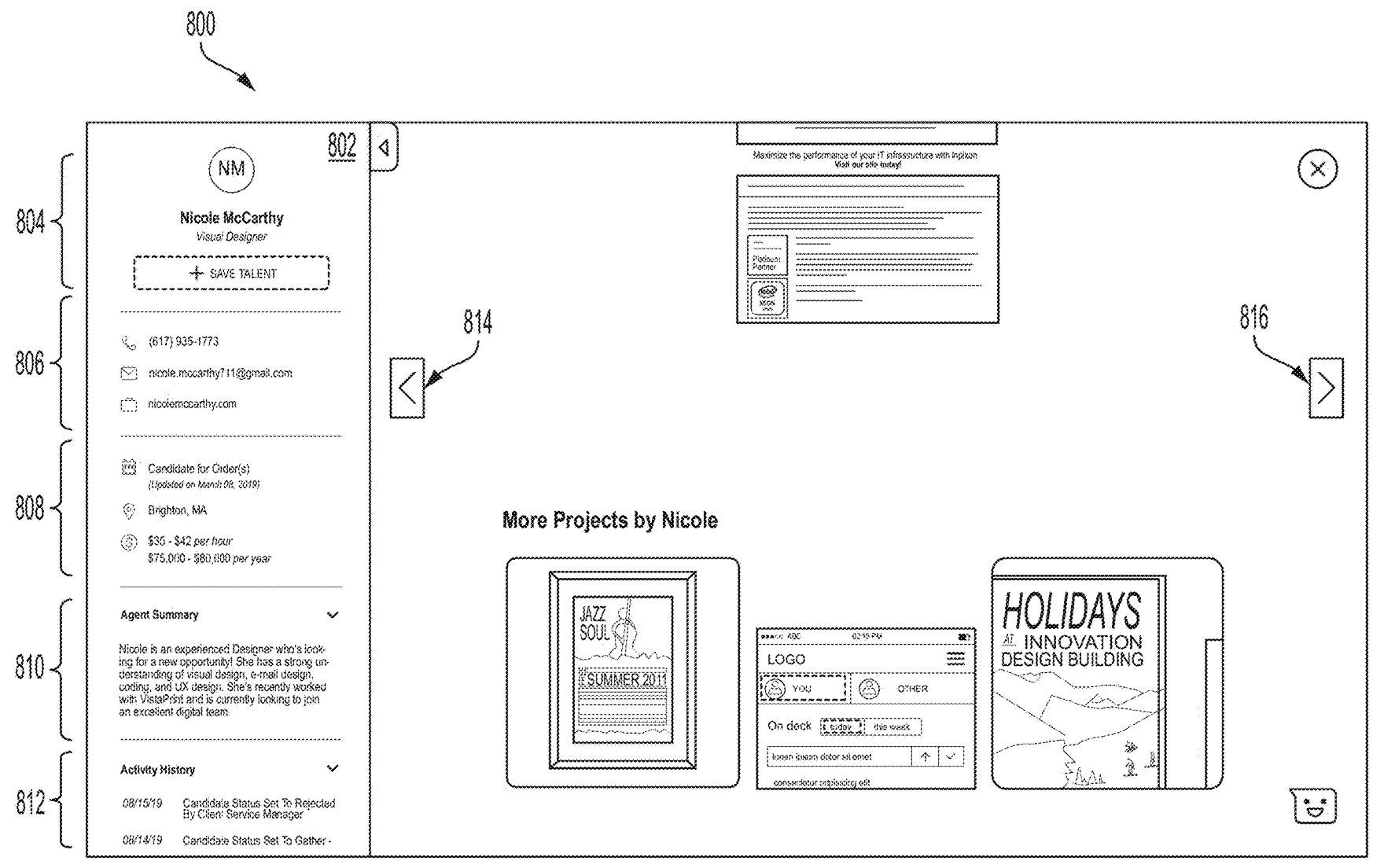
Figure 9:
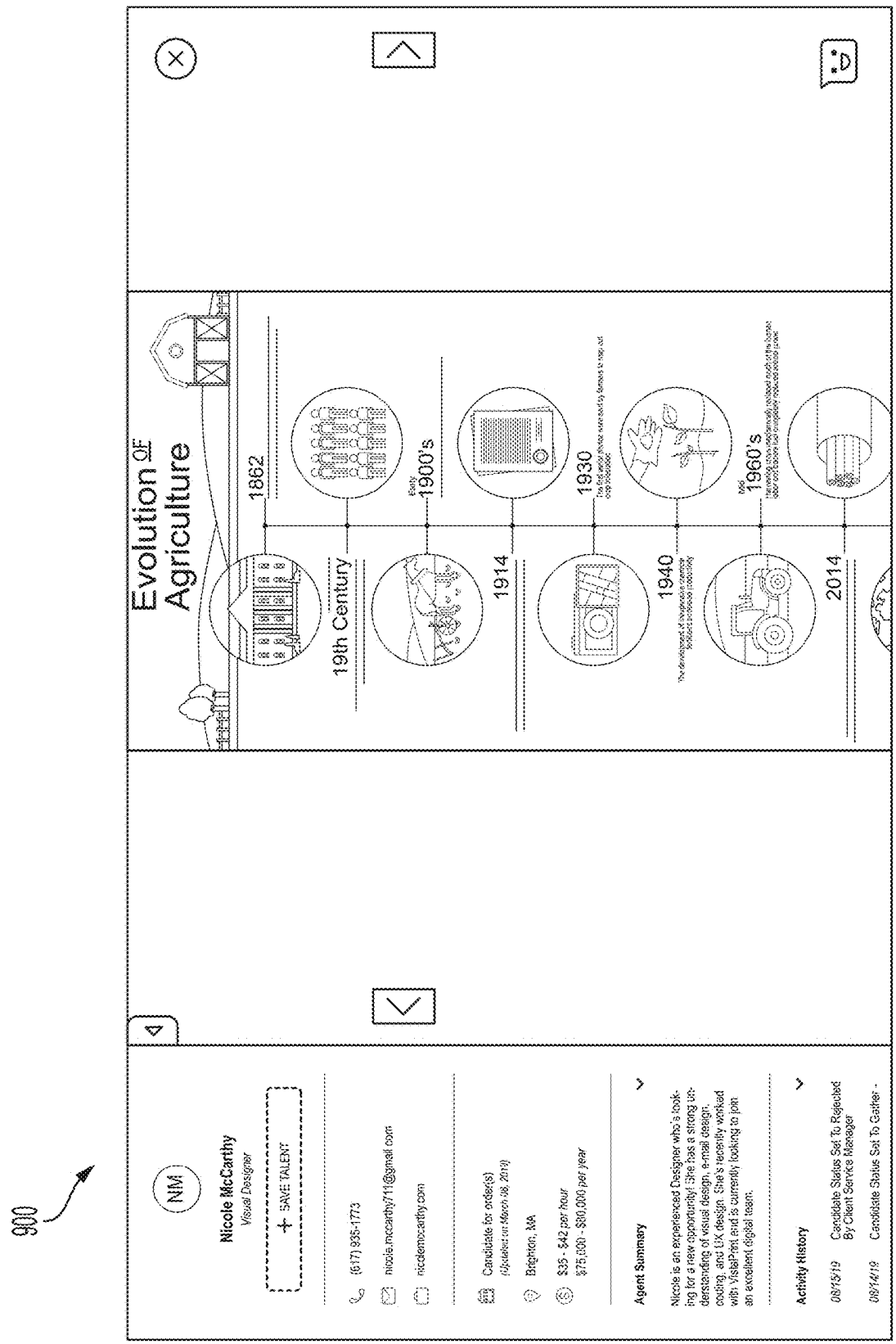
FIG. 9 shows another exemplary project view user interface, according to some embodiments.

FIG. 8 shows an exemplary project view user interface 800, according to some embodiments. The user interface 800 includes a talent pane 802, which includes a talent pane header 804, with a name (e.g., which links to a CloudWall record), job title, and save talent button. The talent contact information 806 includes a phone number, email address, and portfolio links. The filterable talent information 808 includes an availability status, location, pay rate ranges, and additional talent information. The talent pane 802 also includes an agent summary 810 from CloudWall, and an activity history 812. The navigation buttons 814 and 816 allow a user to cycle to previous/next search results. FIG. 9 shows another exemplary project view user interface 900, according to some embodiments.

Figure 10:
FIG. 10 shows an exemplary saved talent user interface, according to some embodiments.
Figure 11:
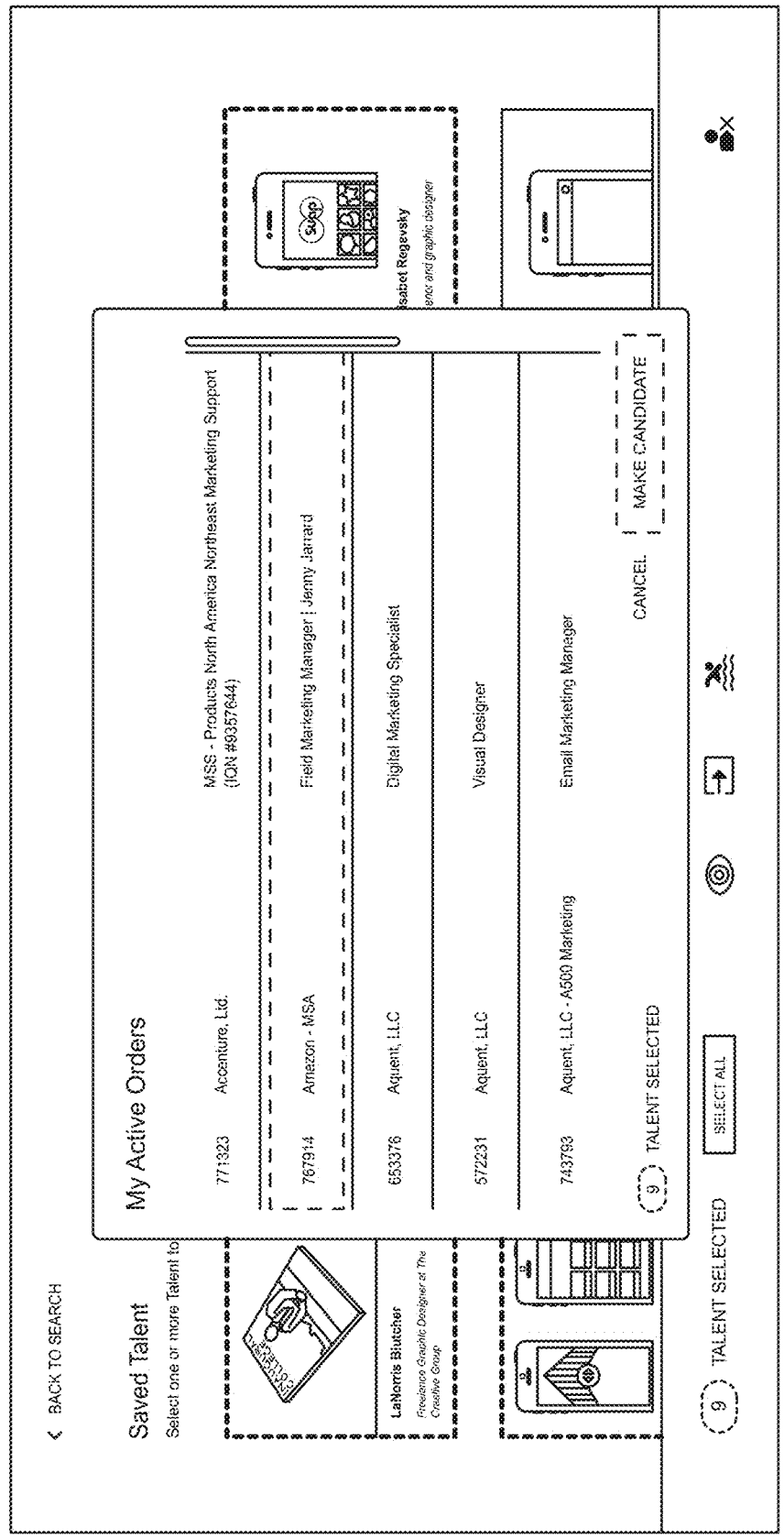
FIG. 11 shows an exemplary active order list user interface, according to some embodiments.

FIG. 10 shows an exemplary saved talent user interface 1000, according to some embodiments. The user interface 1000 includes selectable talent cards 1002. As shown in FIG. 10, candidates, or talent, that a user (e.g., an agent) is interested in can be added to a saved talent list. From this list, the user can associate candidate's with the user's open orders or talent pools. FIG. 11 shows an exemplary active order list user interface 1100, according to some embodiments. The active order list user interface 1100 includes a list of active orders that the user (e.g., an agent) is working to fill.

FIGS. 13A-C show exemplary views of a talent search user interface 1300, according to some embodiments. The talent search user interface 1300 includes a search bar 1302 in which a user may input text to be searched. As shown in the example of FIG. 16A, "iPhone" has been entered into the search bar 1302. The user interface 1300 includes search results 1308. As shown in the example of FIG. 13A, the search results 1308 comprise samples (e.g., images) of work done by one or more talents. The talent search user interface 1300 includes filters 1304 for filtering talent. As shown in the example of FIG. 13A, filters include an availability filter, location filter, pay rate filter, and a minor segment filter. Other filters may be used in the talent search interface 1300 in addition to or instead of the filters shown in FIG. 13A. A user may specify one or more filters to further narrow a talent search. For example, the user may specify:

1. a location filter (e.g., a city, state, zip code, and/or a radius) to see work done by talents in the location,
2. a pay rate filter (e.g., a range of pay rate) to see results of work done by talents in a range of pay rate,
3. an availability filter (e.g., a time period) to see results for talents who are available at a time (e.g., within a time range), and
4. a minor and/or major segment filter to see results for talents who are in specified major and/or minor segment(s). A major segment may be a category of jobs. A minor segment may be a subcategory within a major segment. For example, "designer" may be a major segment and "user interface designer" may be a minor segment of "designer." In another example, "creator" may be a major segment while "art director" may be a minor segment of "creator."

As shown in FIG. 13A, the talent search user interface 1300 includes search guides 1306. The search guides may provide additional terms related to the search text. In the example of FIG. 13A, the search guides 1306 include UI Mobile, poster, package design, corporate, isometric, electronics, phone, and cellphone among other guides.

FIG. 13B shows another portion of the talent search user interface 1300, according to some embodiments. The talent search user interface 1300 includes an option 1310 to open the search in a new tab. The system may be configured to generate a new tab in response to a user selection of the option 1310. The talent search user interface 1300 includes a saved talent option 1312 for allowing a user to access talent that the user has previously saved. An example saved talent user interface is described herein with reference to FIGS. 15A-C. The talent search user interface 1300 includes a feedback option 1314. The system may be configured to provide a user input form for feedback in response to selection of the feedback option 1314.

FIG. 13C shows another portion of the talent search user interface 1300, according to some embodiments. FIG. 13C shows options that the system generates in response to a user hovering over a search result. As shown in FIG. 13C, the talent user interface 1300 includes an image thumbnail 1316 that is being hovered over. When hovered over, the thumbnail 1316 displays a name of a talent that authored the work, and an option to save the talent. The talent search user interface includes an option 1318 to return to the top of the search results. In response to receiving selection of the option 1318 to return to top, the system may return the talent search user interface to a display of an initial set of search results (e.g., to the search results 1308 displayed in FIG. 13A).

Figure 14A:
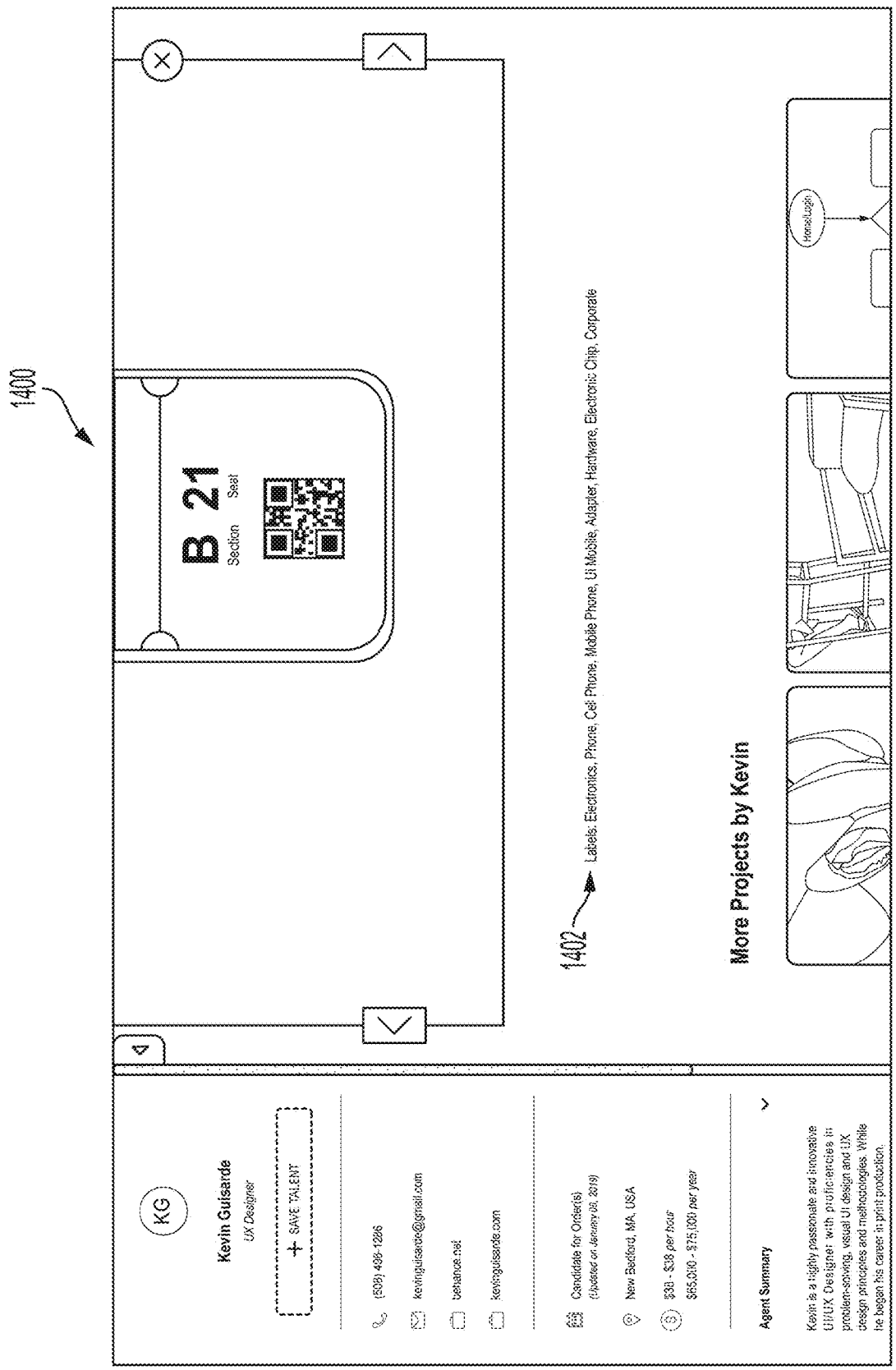
FIGS. 14A-D show views of an exemplary project view user interface, according to some embodiments.

FIG. 14A shows an example of a talent view user interface 1400. The talent view user interface 1400 may allow a user to view work done by a talent. As shown in the example of FIG. 14A, the talent view user interface 1400 shows a project created by the talent. The talent view user interface 1400 includes text 1402 associated with a project image being viewed. For example, the labels 1402 may include results of classification by a machine learning model, results of object detection in the talent's work, and/or other labels. The labels 1402 may include project text and/or search labels.

Figure 14B:
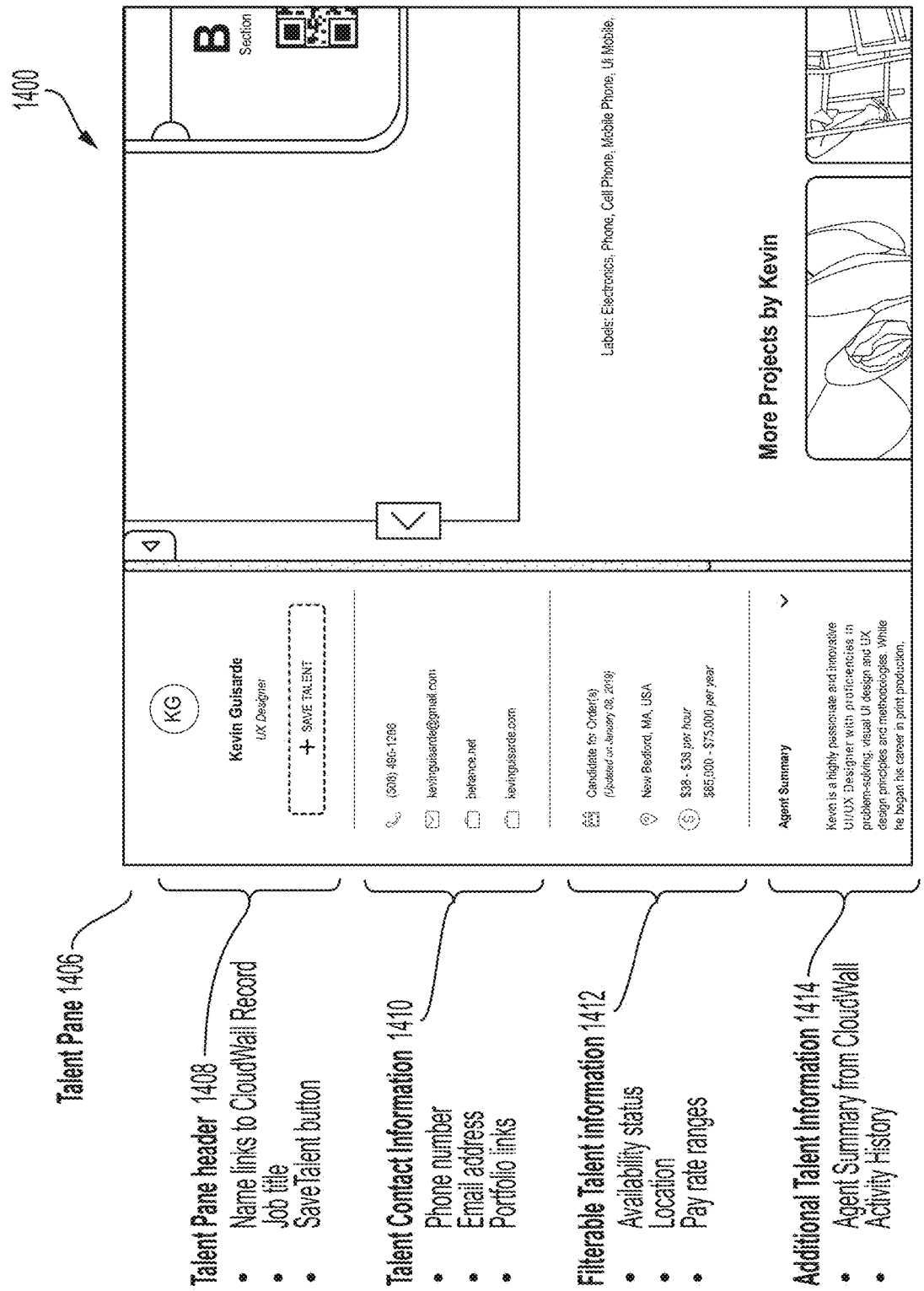

FIG. 14B shows a zoomed in view of a talent pane 1406 in the talent view user interface 1400. The talent pane 1406 includes a talent plan header 1408 which includes a talent name, a job title, and a selectable button to save the talent. The talent pane 1406 includes talent contact information 1410. As shown in the example of FIG. 14B, the talent contact information 1410 includes a phone number, email address, and portfolio links. The talent pane 1406 includes filterable talent information 1412 including an availability of the talent, a location of the talent, and one or more pay rate ranges for the talent. The talent pane 1406 includes additional talent information 1414 such as a summary of the talent and activity history. Some embodiments may display other information in the talent pane 1406 in addition to or instead of information described herein.

Figure 14C:
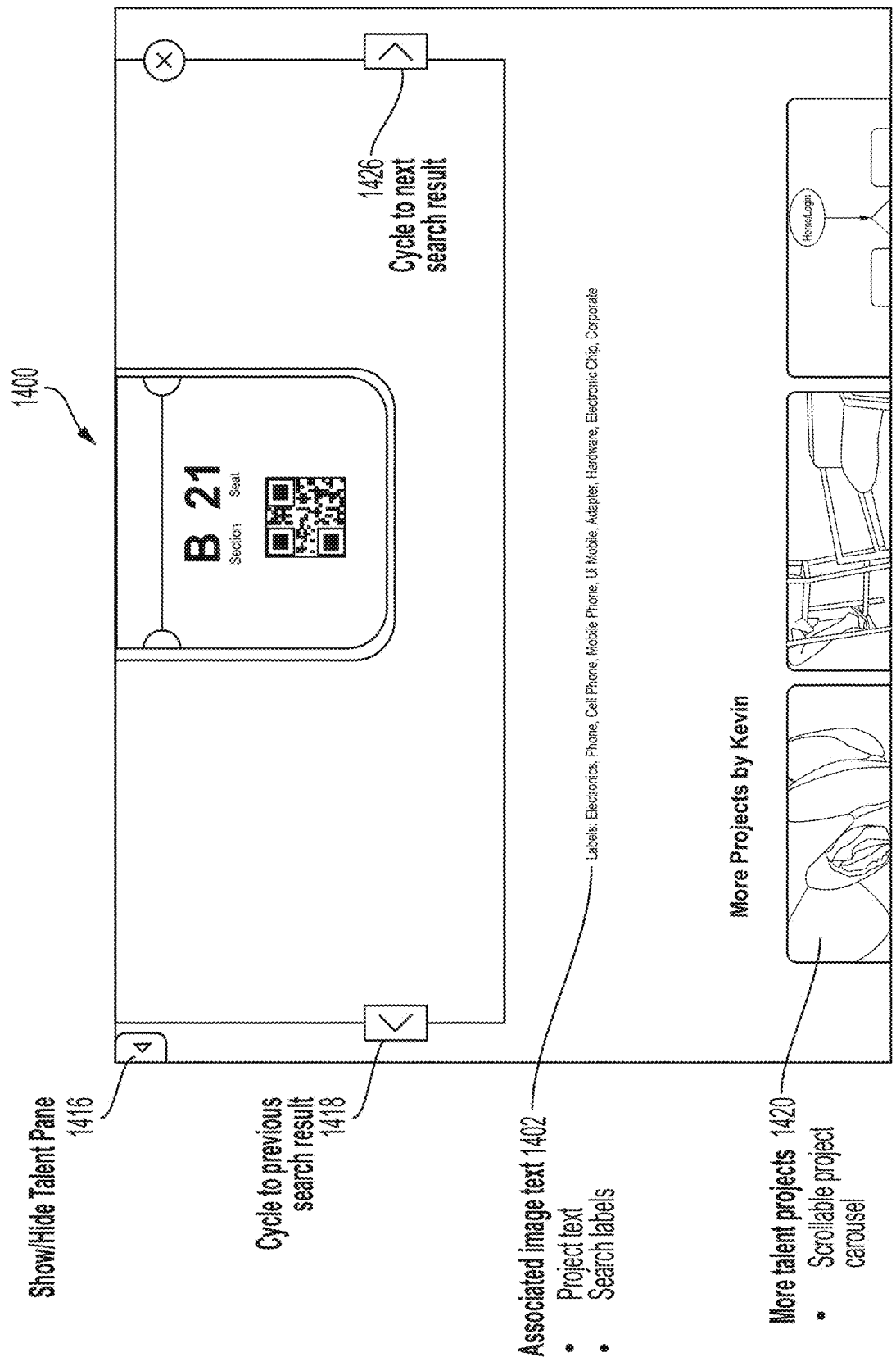

FIG. 14C shows a zoomed in view of another section of the talent view user interface 1400. The talent view user interface 1400 includes an option 1416 to show/hide the talent pane 1406. The system may be configured to toggle between revealing and hiding the talent pane 1406 in response to selection of the option 1416. The talent view user interface 1400 includes an option 1418 to cycle to a previous result, and an option 1426 to cycle to a next search result. The talent view user interface 1400 may be configured to cycle through search results in response to user selection of the options 1416, 1426. The talent view user interface 1400 includes a display 1420 of other work (e.g., other projects) done by the talent. The display 1420 may be a scrollable display of projects done by the talent.

Figure 14D:
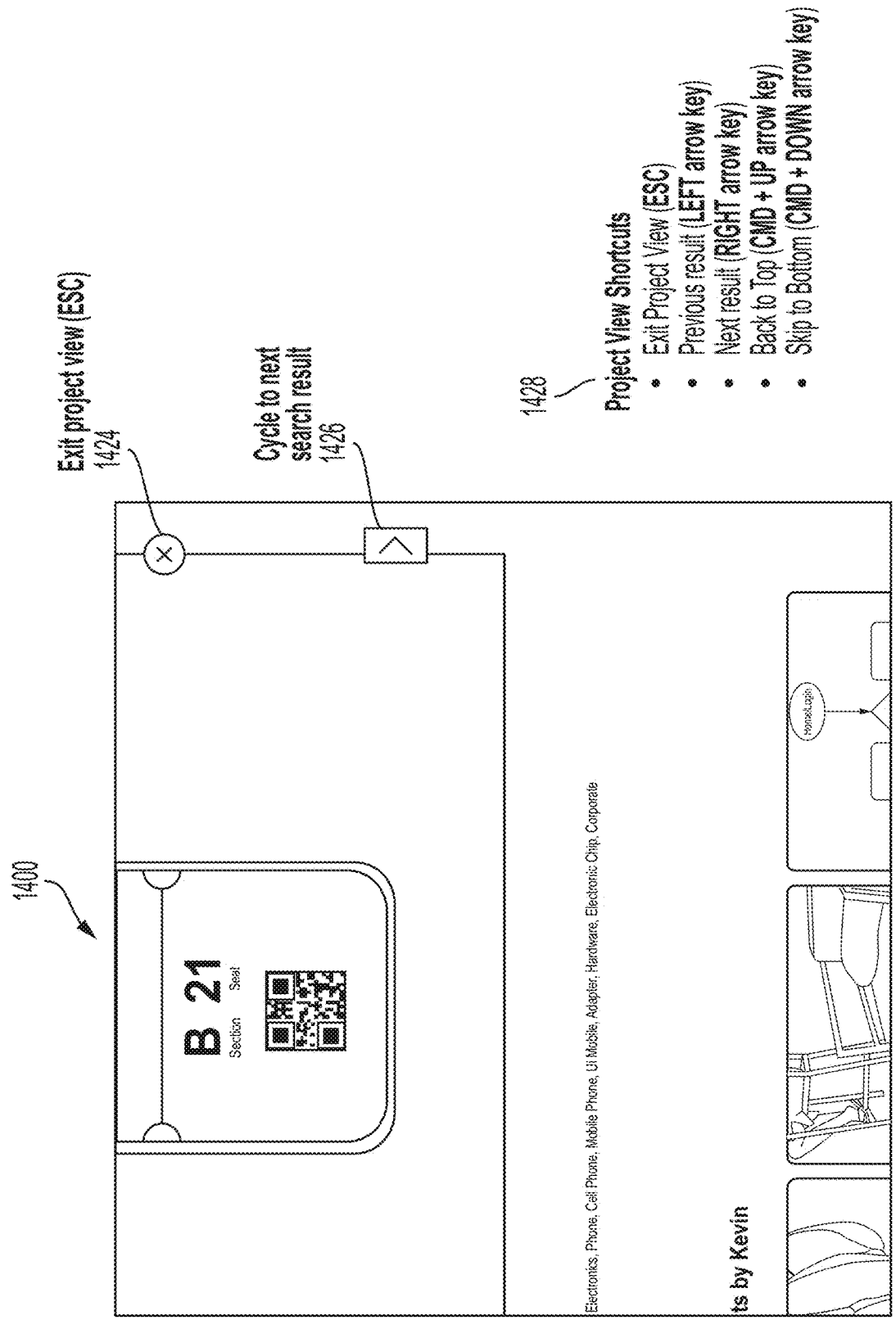

FIG. 14D shows a zoomed in view of another section of the talent view user interface 1400. As shown in FIG. 14D, the talent view user interface 1400 includes an option 1424 to exit the talent view user interface 1400. A user may also press the ESC key to exit the talent view user interface 1400. As shown in FIG. 14D, the talent view user interface 1400 may also react to shortcut keys such as exiting a project view (ESC key), displaying a previous search result (left arrow key), displaying a next search result (right arrow key), going back to the top (command and up arrow key), and skipping to the bottom (command and down arrow key).

Figure 15A:
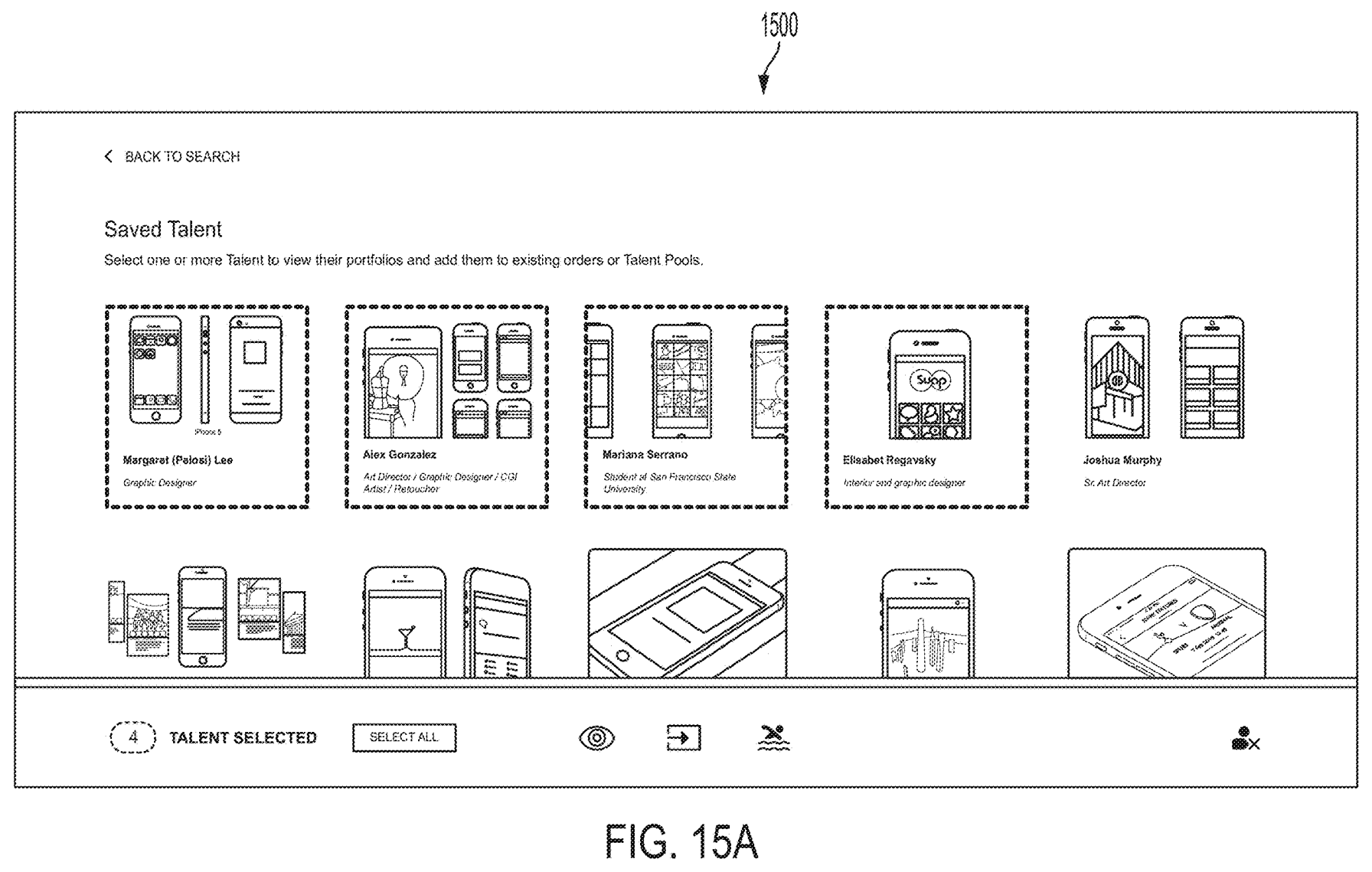
Figure 15B:
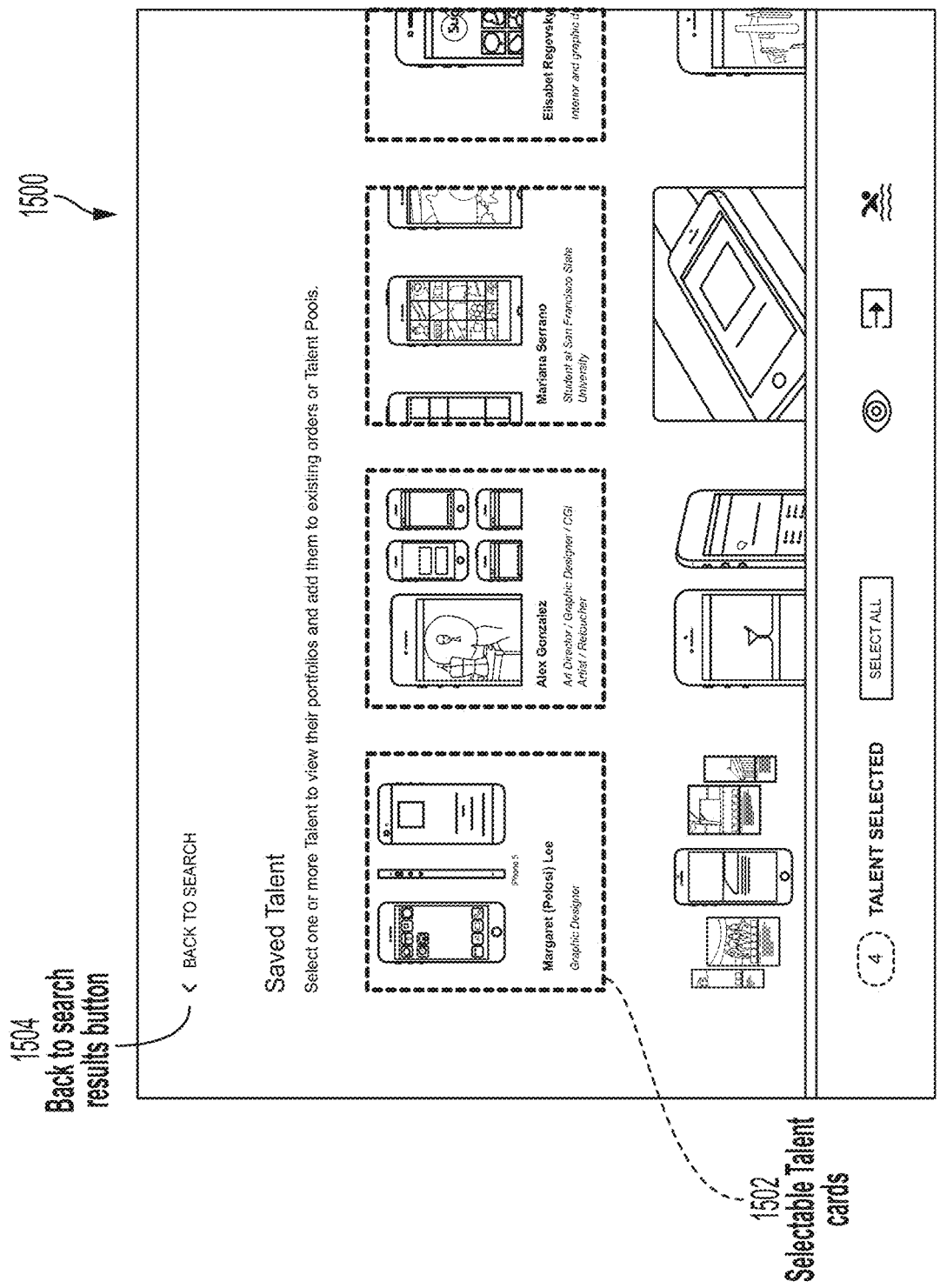

FIG. 15A shows a saved talent user interface 1500. The saved talent user interface 1500 includes one or more talents saved by a user (e.g., from the talent view user interface described with reference to FIGS. 14A-D). In the example of FIG. 15A, the saved talent user interface 1500 includes talents saved by the user, among other talents. FIG. 15B shows that the saved talent user interface 1500 includes selectable talent cards 1502 for respective saved talents. A selectable talent card may display an image of work done by a respective talent. As shown in FIG. 15B, the saved talent user interface 1500 includes an option 1510 to return to search results (e.g., shown in FIGS. 13A-C).

Figure 15C:
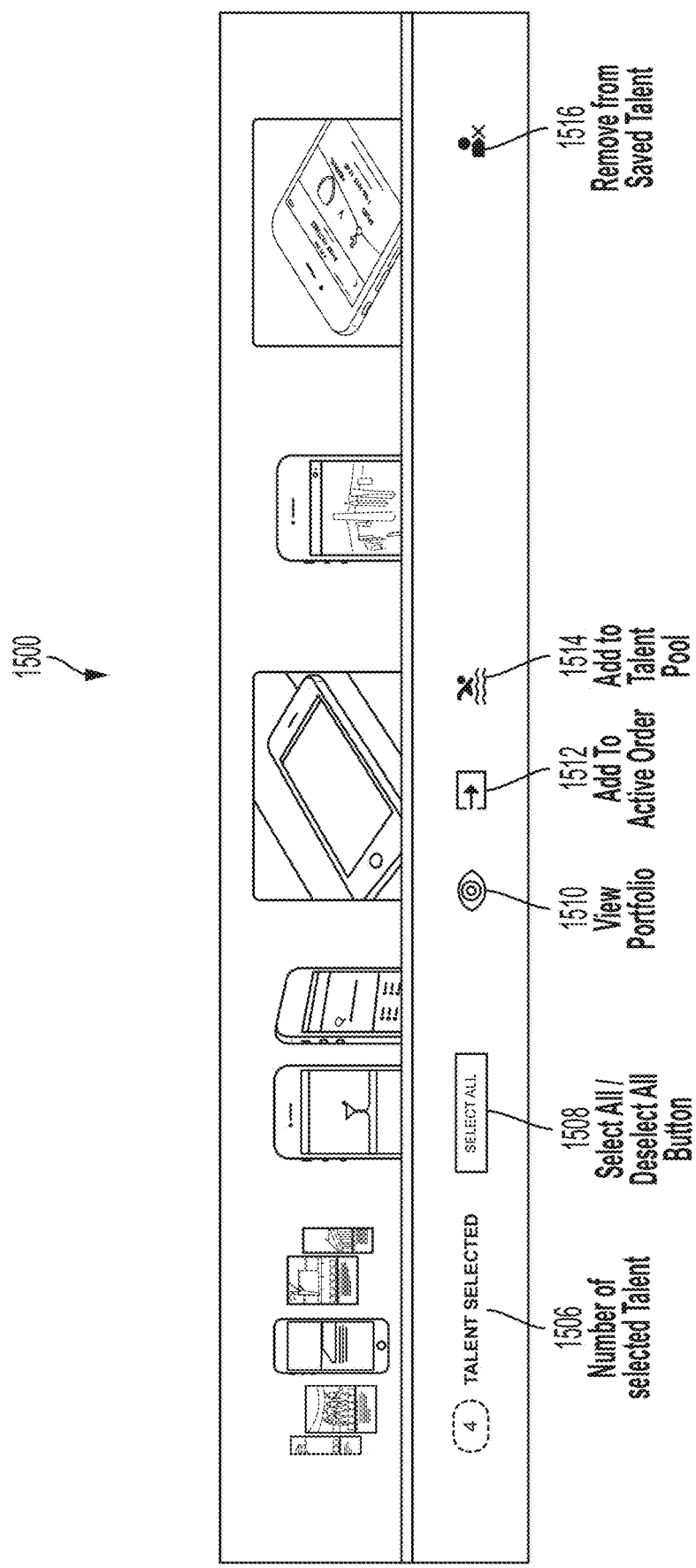

FIG. 15C shows another view of the saved talent user interface 1500. As shown in FIG. 15C, the saved talent user interface 1500 includes an indication 1506 of number of talent selected (e.g., clicked on by a user). The saved talent user interface 1500 includes an option 1508 to select all of the saved talents. The saved talent user interface 1500 includes an option 1510 to view a portfolio of one or more selected talents. The system may be configured to open a user interface screen displaying portfolio(s) of selected talent(s) in response to selection of the view portfolio option 1510. The saved talent user interface 1500 includes an add to active order option 1512. The system may add selected talent(s) in the talent user interface 1500 to an order for hiring the talent(s) in response to selection of the add to active order option 1512. The saved talent user interface 1500 includes an add to talent pool option 1514. In some embodiments, a talent pool may be a set of talents stored by the system for a user. For example, the talent pool may be a record of one or more talents that the user has interest in for one or more job orders. The saved talent user interface 1500 includes an option 1516 to remove a saved talent. The system may be configured to remove selected talent(s) from a set of saved talents in response to selection of the option 1516 to remove from saved talent.

Figure 16:
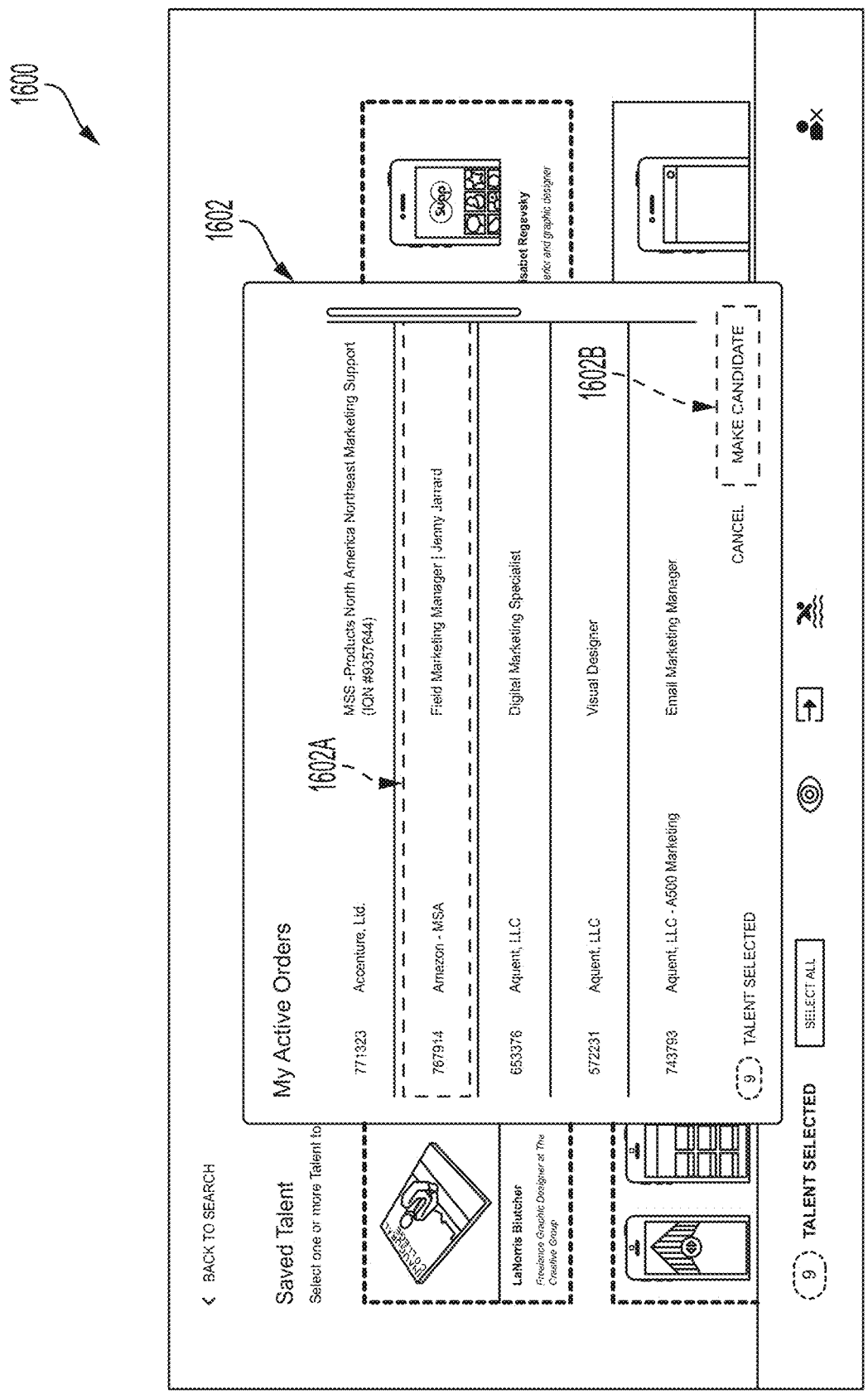
FIG. 16 shows a view of an exemplary user interface for ordering talent(s), according to some embodiments.

FIG. 16 shows an example user interface 1600 for submitting one or more talents as candidates to one or more job orders. The user interface 1600 may be used to make one or more talents (e.g., from the saved talents user interface 1500) candidates for a job. As shown in FIG. 16, the user interface 1600 includes a list 1602 of orders that a user is associated with. The system may receive a selection of one or more orders in the list 1602. In the example of FIG. 16, the user has selected order 1602A. The user interface 1600 includes an option 1602B to make selected talent(s) candidate(s) for selected job orders. In the example of FIG. 16, the system would make the selected talent(s) candidate(s) for job order 1602A selected by the user.

FIG. 17A shows a first view of an example talent search user interface 1700. As shown in FIG. 17A, the user interface 1700 includes a tab 1702 which, when selected, displays search results 1702A-C. Each of the search results may comprise information for a respective talent. For example, search result 1702A provides information about a talent named Jane Cooper, search result 1702B provides information about a talent named Wade Warren, and search result 1702C provides information about a talent named Esther Howard. Information included in a search result is described herein with reference to FIGS. 18A-B.

As illustrated in FIG. 17A, the view of the talent search interface 1700 shown in the figure includes a search pane 1704. The search pane 1704 includes one or more filters that the system may apply to search results. In the example of FIG. 17A, the search pane 1704 includes text input for a user to enter a search query. The search pane 1704 includes an availability filter allowing the user to filter search results based on availability of talents. The availability may be specified by one or more check boxes, where each check box is associated with a respective time period of availability. In the example of FIG. 17A, the availability filter includes a check box for "immediately" and "2 weeks notice." The availability filter may include a date input field in which a user may enter a specific date of availability.

In the embodiment of FIG. 17A, the search pane 1704 includes a salary filter. In the example of FIG. 17A, the search pane 1704 includes an hourly pay filter in which a user may specify a range of hourly pay by inputting a minimum and maximum hourly rate of pay into respective input fields. The search pane 1704 includes a yearly salary pay filter in which a user may specify a range of a yearly salary by inputting a minimum and maximum yearly rate of pay into respective input fields. Some embodiments may include other salary filters such as a fields in which a user may specify minimum and/or maximum amount of pay per quantity of work performed (e.g., per project).

In the embodiment of FIG. 17A, the search pane 1704 includes a location filter. In the example of FIG. 17A, the location filter includes a field in which a user may enter a location indication (e.g., a city, state, zip code, or other location indication) and a radius (e.g., in miles) of the location indication. The radius may be adjustable by the user (e.g., by input or by selection from a set of defined radius options). The location filter includes an input in which a user may specify whether the work is on-site or off-site (e.g., remote). For example, the input comprises a check box to indicate that the talent is available on-site and a check box to indicate that the talent is available off-site.

In the embodiment of FIG. 17A, the search pane 1704 includes a type filter. The type filter may allow a user to specify one or more types of work talents perform. The system may then filter talent search results based on the specified type(s) of work. For example, the type filter may include multiple check boxes, where each check box is associated with a respective type of work. The search pane 1704 includes a segment filter. The segment filter may allow a user to specify one or more segments (e.g., user interface designer and/or art director) for the talent search results that the system is to apply. For example, the segment filter may include multiple check boxes, where each check box is associated with a respective segment.

As shown in the example of FIG. 17A, the search pane 1704 includes a graphical user interface (GUI) element (labelled "apply") that, when selected, applies one or more filters specified by the user (e.g., input into the search pane 1704). The search pane 1704 includes a "clear all" GUI element that, when selected, clears any filters specified by the user (e.g., by input in the search pane 1704).

FIG. 17B shows the talent search interface 1700 of FIG. 17A with the search pane 1704 removed. For example, the talent search interface may provide a GUI element that, when selected, causes the system to toggle between hiding and showing the search pane 1704 shown in FIG. 17A.

FIG. 17C shows the talent search interface 1700 of FIG. 17A with two of the search results selected. In the example of FIG. 17C, a selection 1706A is applied for search result 1702A and a selection of 1706B is applied for search results 1702B. In the example of FIG. 17C, a selection of a search result is specified by selection of a checkbox associated with the search result. As shown in FIG. 17C, the talent search interface 1700 includes a make candidate GUI element that, when selected, causes the system to make the selected talent(s) candidates for one or more job orders (e.g., for open jobs) administered by the user. For example, the system may label the talent(s) as candidates for a job order in a database storing information about the talent(s). In another example, the system may store indications of the talent(s) as talents in a job record storing information of the job order in a database.

Figure 18A:
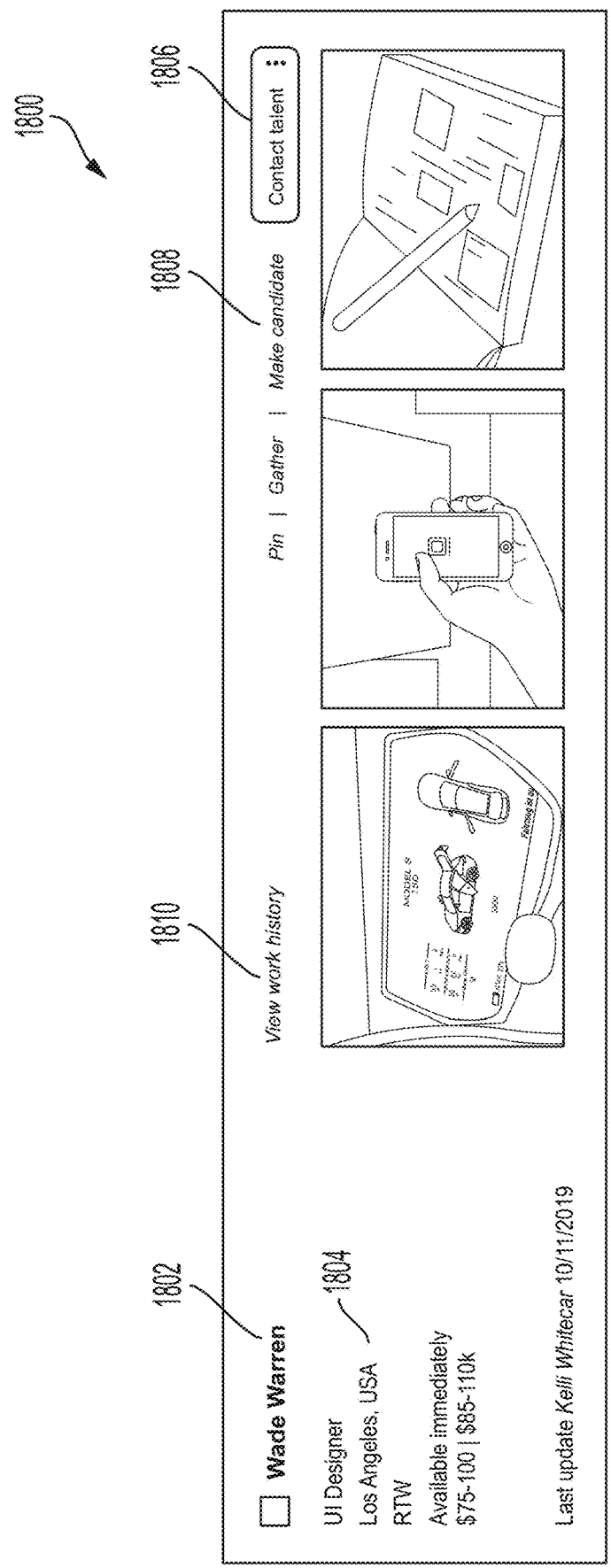

FIG. 18A shows an example talent search result 1800. The search result 1800 includes a talent name 1802, and information 1804 about the talent including a job title, a location (e.g., city, state, and/or country), an availability (e.g., available immediately, in a number of weeks, unavailable), and one or more salary indications (e.g., yearly salary range(s)). The search result 1800 includes a contact talent GUI element 1806. In some embodiments, the system may be configured to initiate a communication to the talent when the contact talent GUI element 1806 is selected (e.g., by opening up a window to enter a message for sending to the talent). In some embodiments, the system may be configured to provide contact information for the talent when the talent GUI element 1806 is selected (e.g., by displaying a phone number and/or email address of the talent stored by the system). As shown in FIG. 18A, the talent search result 1800 includes a "make candidate GUI element" 1808. The system may open a user interface screen that allows a user to make the talent a candidate for one or more job orders when the "make candidate" GUI element 1808 is selected (e.g., by storing an indication of the talent as a candidate for the job order(s) in a database).

The search result 1800 includes a view work history GUI element 1810. The system may be configured to generate the search result display 1820 shown in FIG. 18B. As shown in FIG. 18B, the search result 1820 includes information 1822 about the talent's past work. For example, the search result 1820 includes a job title, company, and years of employment from the talent's past work experience. The search result 1820 also includes a GUI element for viewing work samples of the talent. The system may be configured to provide a talent view interface (e.g., as described with reference to FIGS. 19A-C) when the GUI element is selected.

The search result 1800 includes a status of the talent. In the example of FIG. 18A, the information 1804 about the talent indicates a status of ready to work (RTW). This may indicate that the talent is legally employable for work. Other statuses may be defined by the system. For example, the result may indicate that the talent is not ready to work, or that the talent will be able to work within a time period, or other status. Statuses may be modified, added, and/or removed from the system.

Figure 19A:
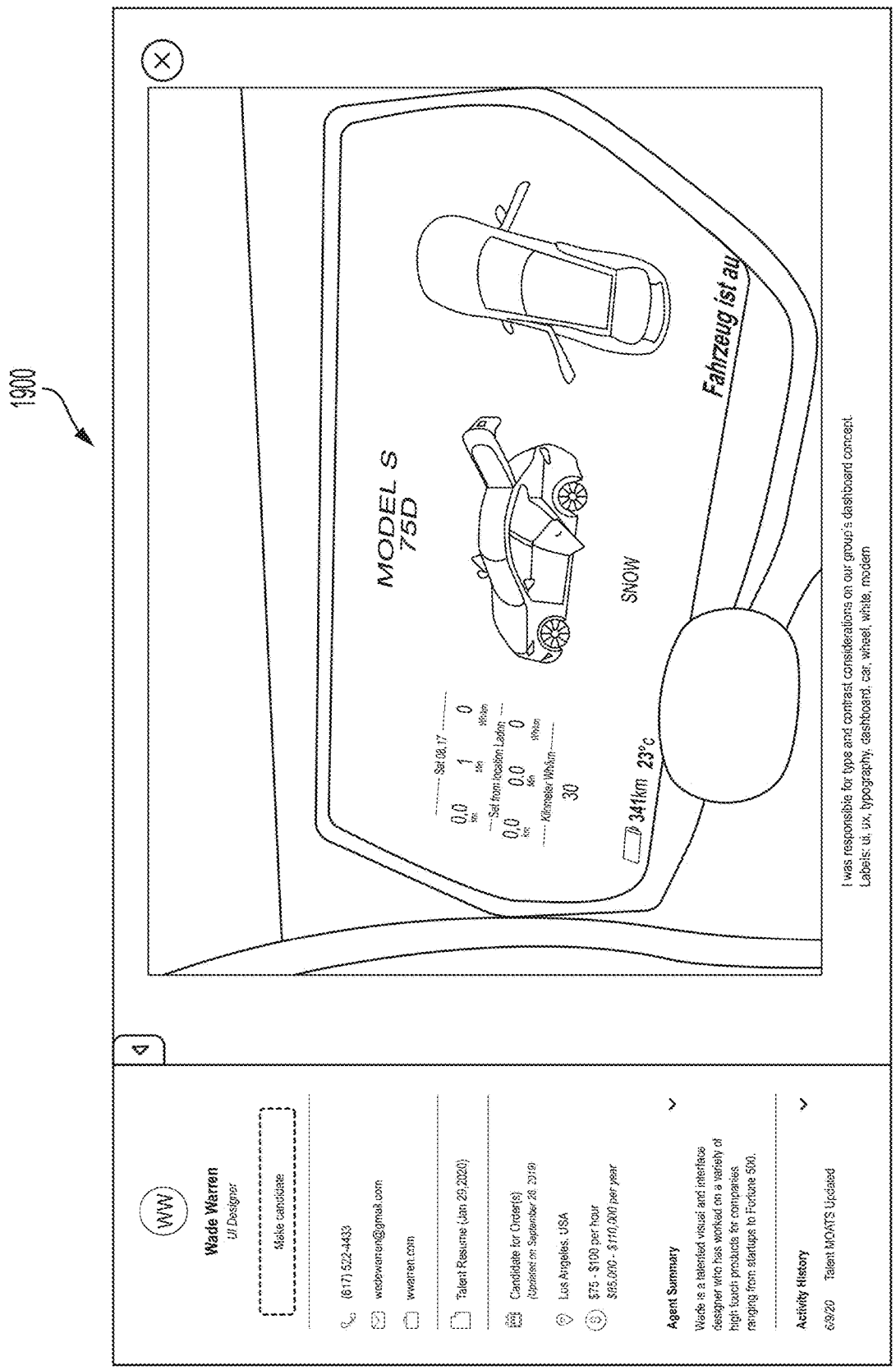
Figure 19B:
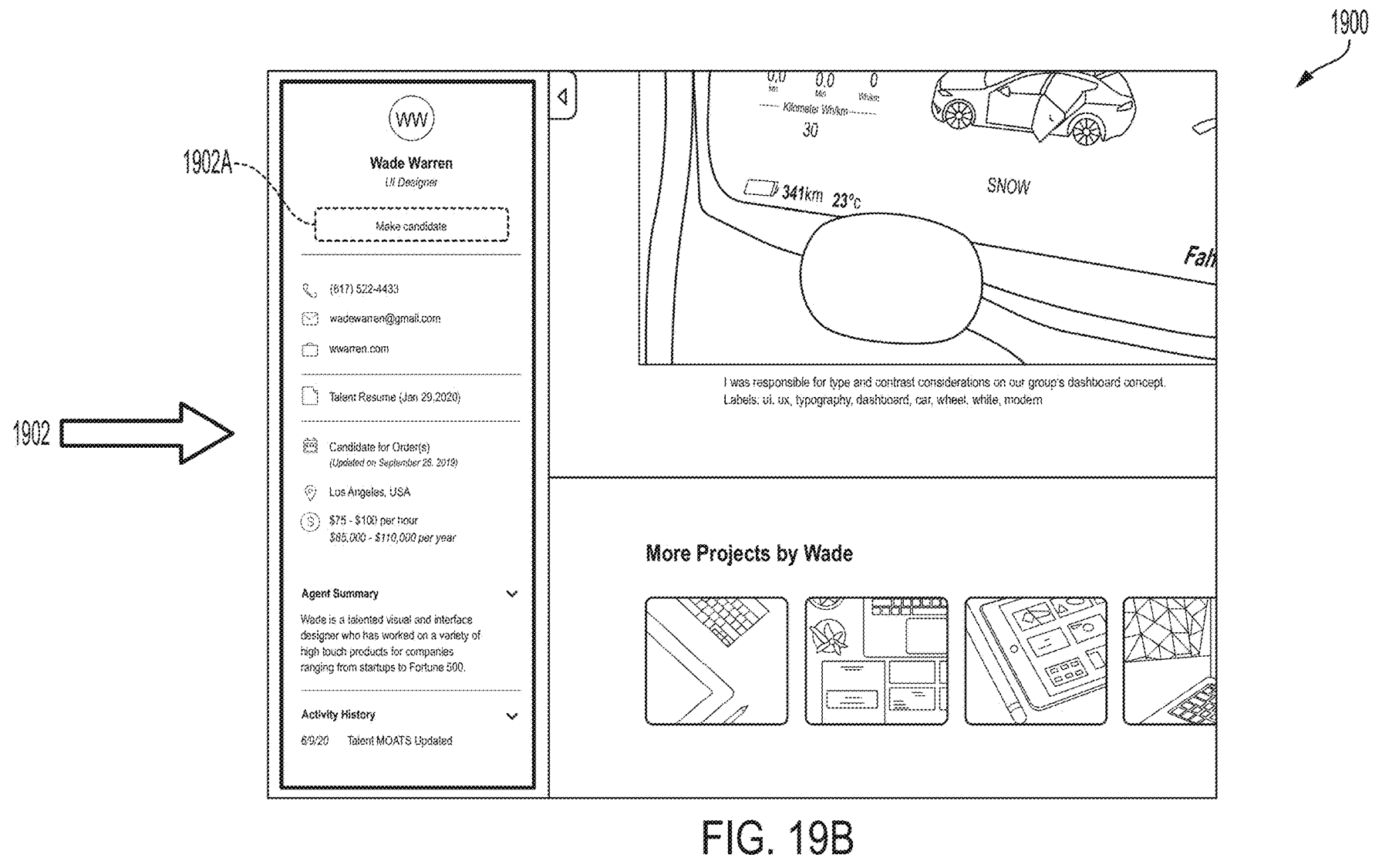
Figure 19C:
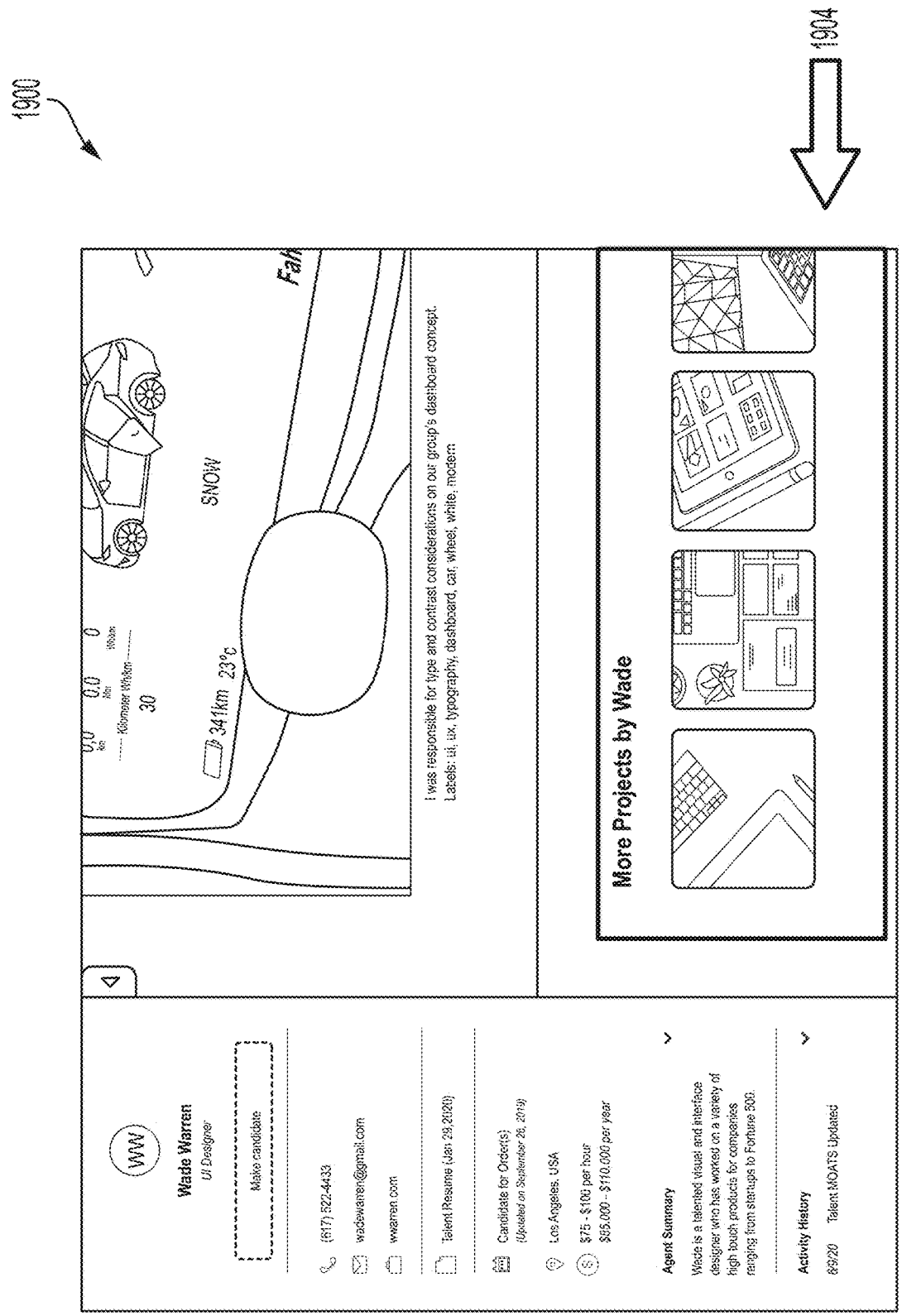

FIG. 19A shows a first view of a talent detail user interface 1900. As shown in FIG. 19A, the talent detail user interface 1900 shows an item of work performed by the talent. For example, the talent detail user interface 1900 may display an image of work performed by the talent as shown in FIG. 19A. FIG. 19B shows another view of the talent detail user interface 1900 including a candidate pane 1902. The candidate pane 1902 includes a "make candidate" GUI element 1902A. The system may be configured to make the talent being viewed a candidate for one or more job orders when the GUI element 1902A is selected. The candidate pane 1902 may display information about the talent. In the example of FIG. 19B, the information includes contact information (e.g., email address and phone number), a website associated with the talent (e.g., storing work of the talent), a link to the talent's resume, a location (e.g., Los Angeles, USA), salary ranges for the talent (e.g., in hourly pay rate and/or yearly pay rate), a written summary of the talent (e.g., written by the talent), and activity history for the talent (e.g., providing indications of actions within the system associated with the talent." FIG. 19C shows another view of the talent detail user interface 1900. As shown in FIG. 19C, the talent detail user interface 1900 includes a display 1904 of one or more projects (e.g., visual work(s)) by the talent. The project(s) in the display 1904 may be selectable. The system may be configured to replace the project displayed in FIG. 19A in response to selection of a different project from the display 1904.

Figure 20A:
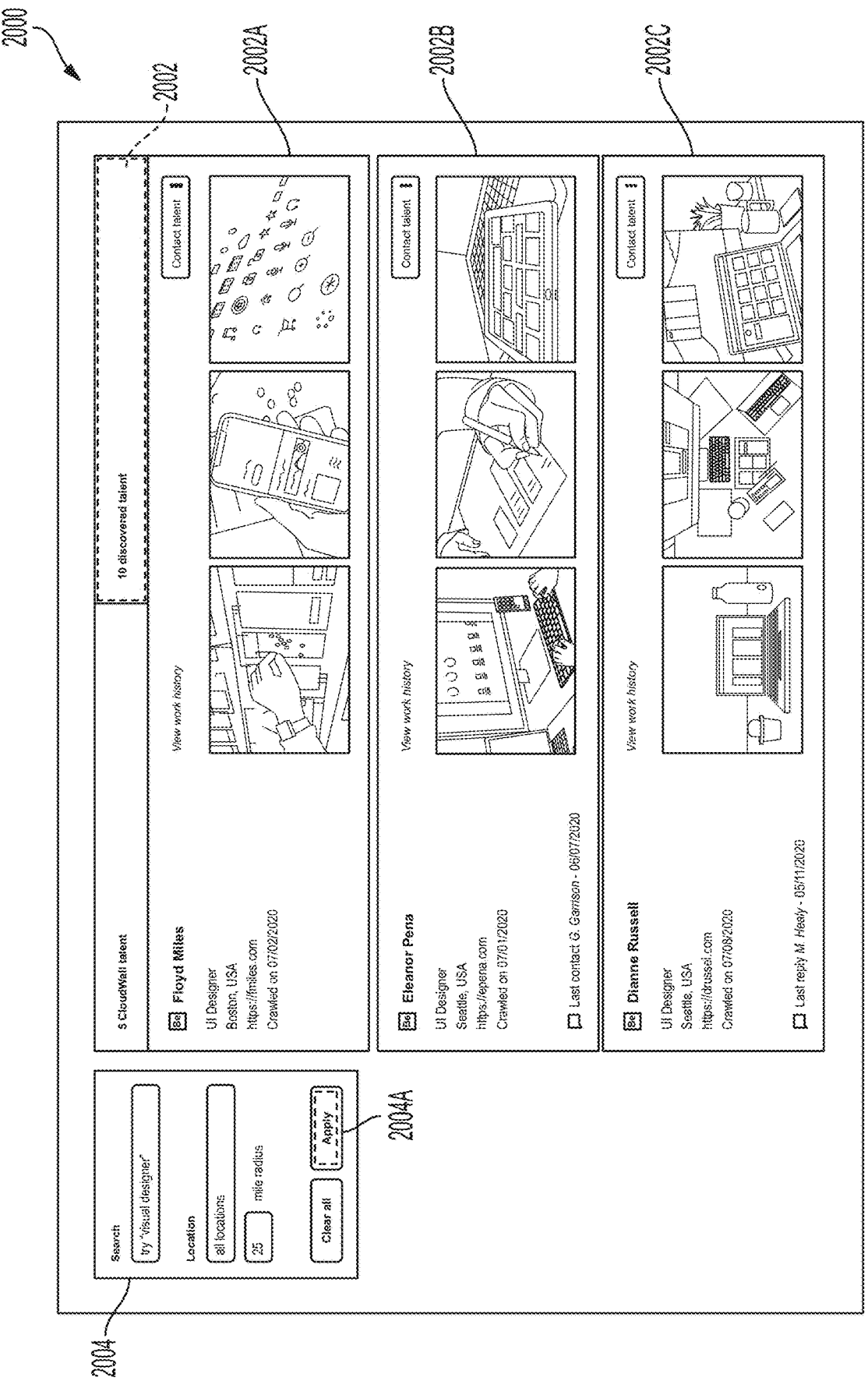
Figure 20B:
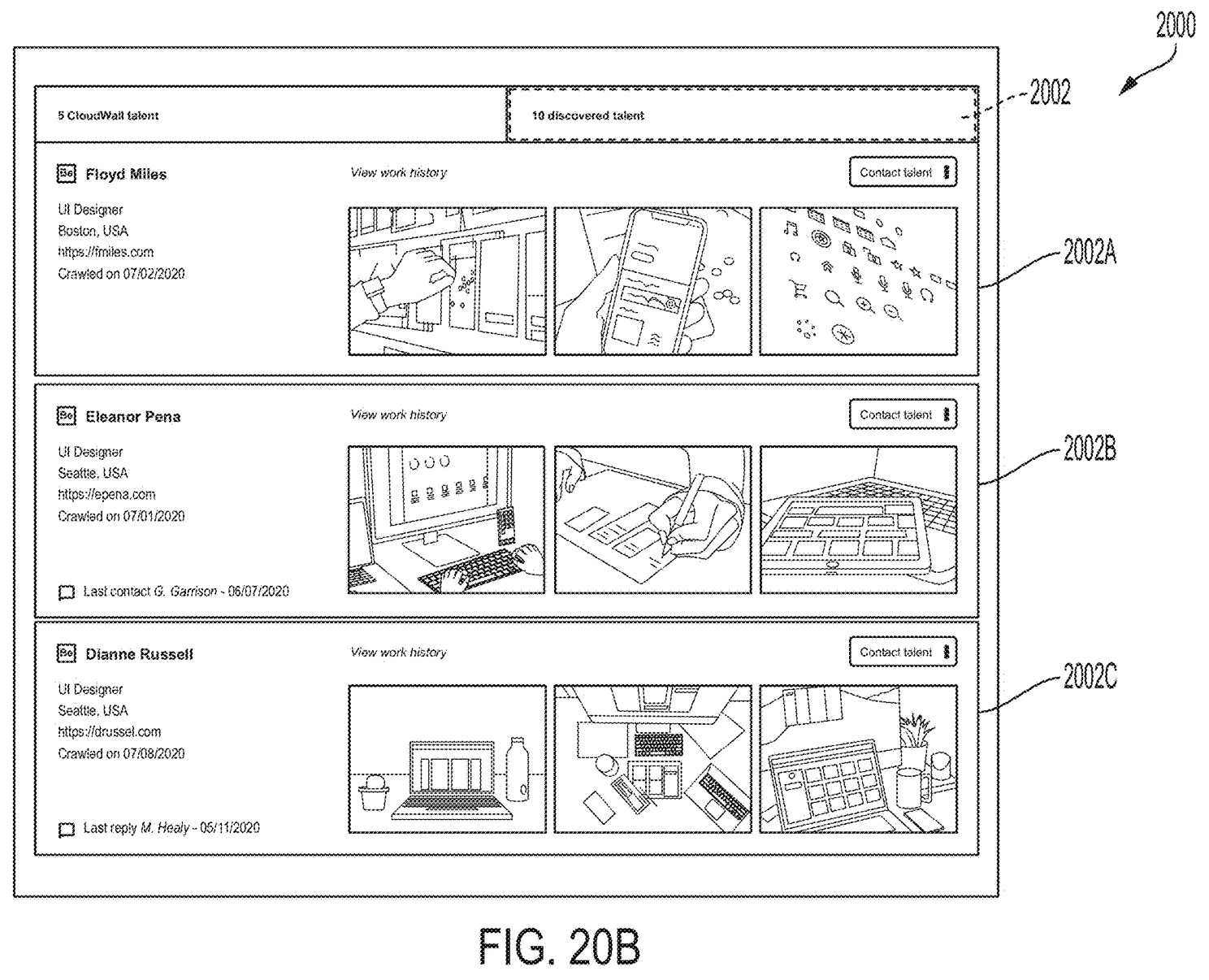

FIG. 20A shows a view of a talent search interface 2000. As shown in FIG. 20A, the talent search interface 2000 includes multiple tabs including a discovered talent tab 2002. The discovered talent tab 2002, when selected shows search results for one or more potential talents discovered by the system (e.g., by performing process 2500 described herein with reference to FIG. 25). The discovered talent tab 2002 display includes search results 2002A-C, where each search result is associated with a respective talent. For example, result 2002A is associated with a talent named Floyd Miles, result 2002B is associated with Eleanor Pena, and result 2002C is associated with Dianne Russell. The talent search interface 2000 includes a pane 2004 for searching, and filtering results. The pane 2004 includes a search input field in which user can enter text based on which the system may filter discovered talent search results. The pane 2004 includes a location filter. The location filter includes a field to enter a location indication (e.g., city, state, and/or country) and a radius of a boundary centered at the location (e.g., in miles). FIG. 20B shows the talent search interface 2000 with the pane 2004 removed. In some embodiments, the talent search interface 2000 may include a GUI element that, when selected, toggles between hiding and displaying the pane 2004.

Figure 21A:
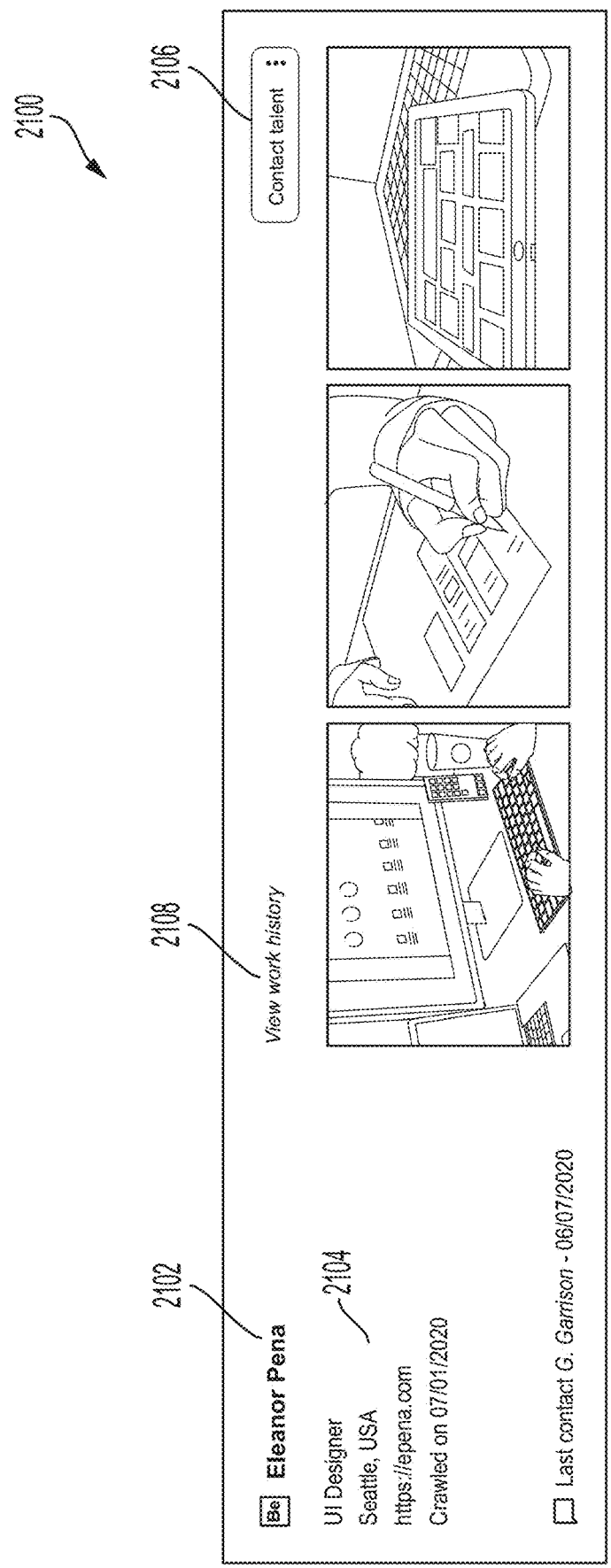
FIGS. 21A-B show views of an exemplary discovered talent search result, according to some embodiments.
Figure 21B:

FIG. 21A shows a search result 2100 of a discovered talent search (e.g., result 2002B from FIG. 20). As shown in FIG. 21A, the search result 2100 includes a name 2102 of the talent and information 2104 about the talent including a job title, a location, and a website associated with the talent. The search result 2100 includes a "contact talent" GUI element 2106. When selected, the system may provide contact information for the talent. As shown in FIG. 21A, the search result 2100 does not include a "make candidate" option because the discovered talent is not stored by the system (e.g., unlike talent search results for talents who have a record in the system). The search result 2100 includes a GUI element 2108 that, when selected, causes the system to show work history of the talent. When selected, the system may show the view of the search result 2110 shown in FIG. 21B. The search result 2110 shows work history information 2110 about the talent. For example, the work history information 2112 may include job title, company, and years of employment at each company.

Figure 12:
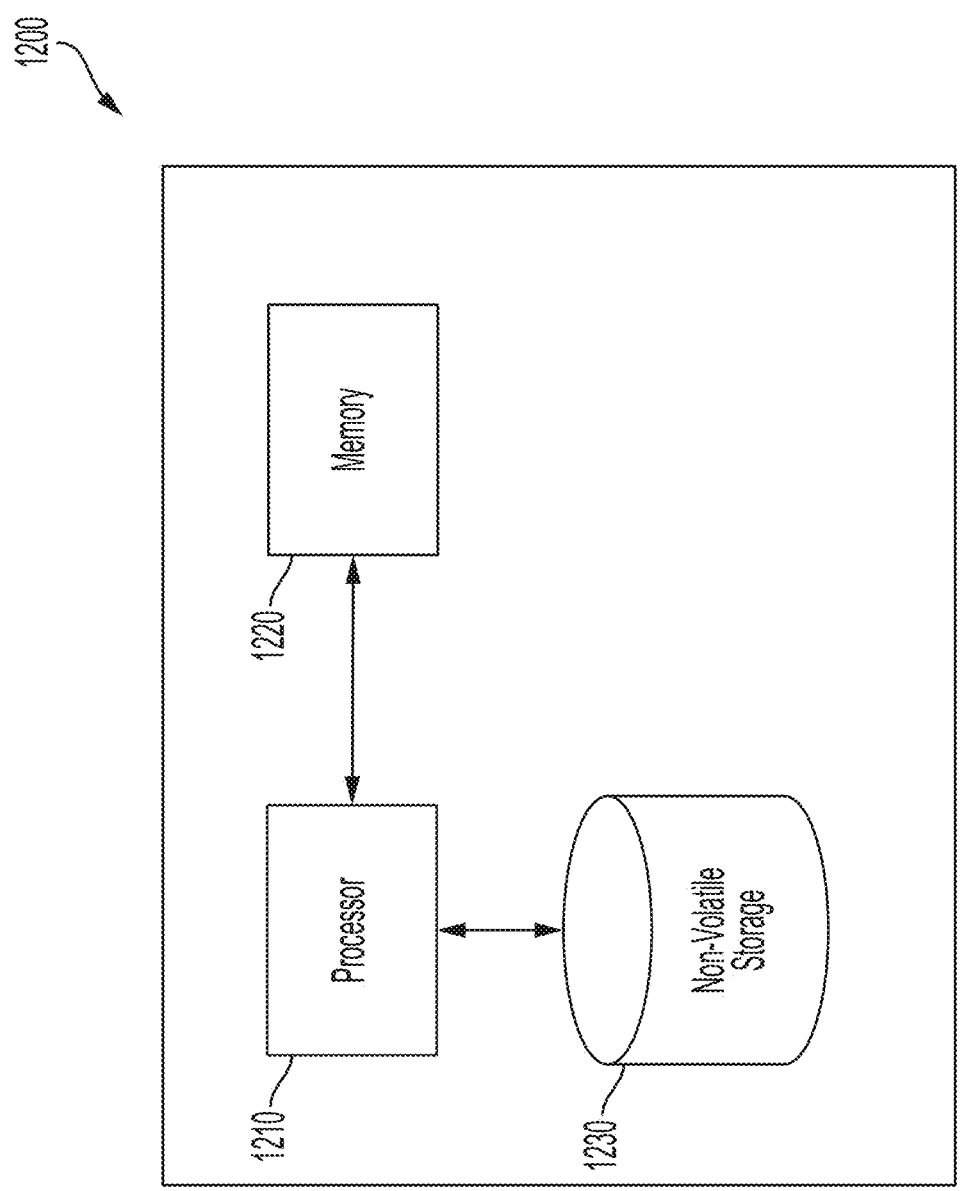
FIG. 12 shows an illustrative implementation of a computer system that may be used to perform any of the aspects of the techniques and embodiments disclosed herein.

An illustrative implementation of a computer system 1200 that may be used to perform any of the aspects of the techniques and embodiments disclosed herein is shown in FIG. 12. The computer system 1200 may include one or more processors 1210 and one or more non-transitory computer-readable storage media (e.g., memory 1220 and one or more non-volatile storage media 1230). The processor 1210 may control writing data to and reading data from the memory 1220 and the non-volatile storage device 1230 in any suitable manner, as the aspects of the invention described herein are not limited in this respect. To perform functionality and/or techniques described herein, the processor 1210 may execute one or more instructions stored in one or more computer-readable storage media (e.g., the memory 1220, storage media, etc.), which may serve as non-transitory computer-readable storage media storing instructions for execution by the processor 1210.

In connection with techniques described herein, code used to implement the techniques described herein for processing and searching for visual candidate roles may be stored on one or more computer-readable storage media of computer system 1200. Processor 1210 may execute any such code to provide any techniques for managing devices as described herein. Any other software, programs or instructions described herein may also be stored and executed by computer system 1200. It will be appreciated that computer code may be applied to any aspects of methods and techniques described herein. For example, computer code may be applied to interact with an operating system to process candidates (including candidate portfolios) and search for candidates as described herein through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A computer-implemented method for providing a visual talent search engine for executing an image search on a datastore storing a plurality of images of visual works created by a plurality of talents, the method comprising:
   using a processor to perform:
      storing, in memory, one or more search indexes for the plurality of images of visual works created by the plurality of talents, the one or more indexes storing:
         talent information for the plurality of images of the visual works including, for each of the plurality of images of the visual works, an identification of an author who created the image of the visual work; and
         a plurality of labels associated with the plurality of images;
      receiving data indicative of a search request;
      searching the one or more search indexes based on the received data indicative of the search request to determine a set of search results, the set of search results comprising one or more of the plurality of images of the visual works, wherein the searching comprises:
         identifying the one or more images of one or more visual works by matching the search request to one or more of the plurality of labels associated with the plurality of images of the visual works; and
         obtaining, from the talent information for the plurality of images stored in the one or more search indexes, for each of the identified one or more images of the one or more visual works, a respective identification of an author who created the image of the visual work; and
      displaying at least a portion of the set of search results in a graphical user interface, the displaying comprising displaying, in the graphical user interface, a plurality of selectable talent cards, each talent card comprising:
         a set of the identified one or more images of the one or more visual works that are associated with a same author who created the set of the identified one or more images;
         an identification of the author who created the set of the identified one or more images co-located with the set of the identified one or more images in the talent card in the graphical user interface;
         information about the author who created the set of the identified one or more images, including at least one of a job title of the author, a hiring availability of the author, salary information for the author, and work history of the author; and
      wherein the talent card can be selected to add the author to an open order for work, to add the author to a saved talent list, or both.

2. The method of claim 1, further comprising ranking the set of search results based on the search request, wherein the ranking comprises applying natural language processing (NLP) similar term matching, NLP relevance, or both.

3. The method of claim 1, further comprising:
   receiving at least one image of a visual work created by a talent; and
   processing the at least one image using one or more machine learning techniques to add the at least one image to the one or more search indexes.

4. The method of claim 3, further comprising:
   processing the at least one image by applying, to the at least one image, machine learning classification to generate at least one label for the at least one image; and
   storing, in the one or more search indexes, the at least one label in association with the at least one image.

5. The method of claim 3, further comprising:
   processing the at least one image by applying, to the at least one image, machine learning object detection to generate at least one label for the at least one image; and
   storing, in the one or more search indexes, the at least one label in association with the at least one image.

6. The method of claim 3, further comprising:
   obtaining a set of images, comprising a set of training images, a set of validation images, a set of test images, or some combination thereof;
   dividing each image in the set of images into a plurality of sub-images; and
   training a pre-trained neural network using the plurality of sub-images.

7. The method of claim 3, wherein processing the at least one image comprises:
   dividing the at least one image into a plurality of sub-images;
   processing each of the sub-images using the one or more machine learning techniques to obtain a classification for each sub-image; and
   averaging classifications of the sub-images to determine a classification for the at least one image.

8. The method of claim 3, wherein processing the at least one image using the one or more machine learning techniques comprises using a neural network to classify the at least one image.

9. A non-transitory computer-readable media comprising instructions that, when executed by one or more processors on a computing device, are operable to cause the one or more processors to execute an image search on a datastore storing a plurality of images of visual works created by a plurality of talents:
   storing, in memory, one or more search indexes for the plurality of images of visual works created by the plurality of talents, the one or more indexes storing:
      talent information for the plurality of images of the visual works including, for each of the plurality of images of the visual works, an identification of an author who created the image of the visual work; and
      a plurality of labels associated with the plurality of images;
   receiving data indicative of a search request;
   searching the one or more search indexes based on the received data indicative of the search request to determine a set of search results, the set of search results comprising one or more of the plurality of images of the visual works, wherein the searching comprises:

identifying the one or more images of the one or more visual works by matching the search request to one or more of the plurality of labels associated with the plurality of images of the visual works; and obtaining, from the talent information for the plurality of images stored in the one or more search indexes, for each of the identified one or more images of the one or more visual works, a respective identification of an author who created the image of the visual work; and displaying at least a portion of the set of search results in a graphical user interface, the displaying comprising displaying, in the graphical user interface, a plurality of selectable talent cards, each talent card comprising:

a set of the identified one or more images of the one or more visual works that are associated with a same author who created the set of the identified one or more images;

an identification of the author who created the set of the identified one or more images co-located with the set of the identified one or more images in the talent card in the graphical user interface;

information about the author who created the set of the identified one or more images, including at least one of a job title of the author, a hiring availability of the author, salary information for the author, and work history of the author; and wherein the talent card can be selected to add the author to an open order for work, to add the author to a saved talent list, or both.

10. The non-transitory computer-readable media of claim 9, wherein the instructions further cause the one or more processors to execute ranking the set of search results based on the search request, wherein the ranking comprises applying natural language processing (NLP) similar term matching, NLP relevance, or both.

11. The non-transitory computer-readable media of claim 9, wherein the instructions further cause the one or more processors to execute:

receiving at least one image of a visual work created by a talent; and processing the at least one image using one or more machine learning techniques to add the at least one image to the one or more search indexes.

12. The non-transitory computer-readable media of claim 11, wherein the instructions further cause the one or more processors to execute:

processing the at least one image by applying, to the at least one image, machine learning classification to generate at least one label for the at least one image; and storing, in the one or more search indexes, the at least one label in association with the at least one image.

13. The non-transitory computer-readable media of claim 11, wherein the instructions further cause the one or more processors to execute:

processing the at least one image by applying, to the at least one image, machine learning object detection to generate at least one label for the at least one image; and storing, in the one or more search indexes, the at least one label in association with the at least one image.

14. The non-transitory computer-readable media of claim 11, wherein processing the at least one image comprises:

dividing the at least one image into a plurality of sub-images;

processing each of the sub-images using the one or more machine learning techniques to obtain a classification for each sub-image; and averaging classifications of the sub-images to determine a classification for the at least one image.

15. A system for executing an image search on a datastore storing a plurality of images of visual works created by a plurality of talents, the system comprising:

a memory storing:

instructions; and one or more search indexes for the plurality of images of visual works created by the plurality of talents, the one or more search indexes storing:

talent information for the plurality of images of the visual works, for each of the plurality of images of the visual works, an identification of an author who created the image of the visual work; and a plurality of labels associated with the plurality of images; and a processor configured to:

receive data indicative of a search request;

search the one or more search indexes based on the received data indicative of the search request to determine a set of search results, the set of search results comprising one or more of the plurality of images of the visual works, wherein the searching comprises:

identifying the one or more images of the one or more visual works by matching the search request to one or more of the plurality of labels associated with the plurality of images of the visual works; and obtaining, from the talent information for the plurality of images stored in the one or more search indexes, for each of the identified one or more images of the one or more visual works, a respective identification of an author who created the image of the visual work; and display at least a portion of the set of search results a graphical user interface, the displaying comprising displaying, in the graphical user interface, a plurality of selectable talent cards, each talent card comprising:

a set of the identified one or more images of the one or more visual works that are associated with a same author who created the set of the identified one or more images;

an identification of the author who created the set of the identified one or more images co-located with the set of the identified one or more images in the talent card in the graphical user interface;

information about the author who created the set of the identified one or more images, including at least one of a job title of the author, a hiring availability of the author, salary information for the author, and work history of the author; and wherein the talent card can be selected to add the author to an open order for work, to add the author to a saved talent list, or both.

16. The system of claim 15, wherein the processor is further configured to:
receive at least one image of a visual work created by a talent; and
process the at least one image using one or more machine learning techniques to add the at least one image to the one or more search indexes.

17. The system of claim 16, wherein the processor is further configured to:
process the at least one image by applying, to the at least one image, machine learning classification to generate at least one label for the at least one image; and
store, in the one or more search indexes, the at least one label in association with the at least one image.

18. The system of claim 16, wherein the processor is further configured to:
process the at least one image by applying, to the at least one image, machine learning object detection to generate at least one label for the at least one image; and
store, in the one or more search indexes, the at least one label in association with the at least one image.

19. The system of claim 16, wherein the processor is further configured to:
obtain a set of images comprising a set of training images, a set of validation images, a set of test images, or some combination thereof;
divide each image in the set of images into a plurality of sub-images; and
training a pre-trained neural network using the plurality of sub-images.

20. The system of claim 16, wherein the processor is configured to process the at least one image by:
dividing the at least one image into a plurality of sub-images;
processing each of the sub-images using the one or more machine learning techniques to obtain a classification for each sub-image; and
averaging classifications of the sub-images to determine a classification for the at least one image.

21. The method of claim 1, wherein the plurality of images of visual works created by the plurality of talents comprise graphical content designed by the plurality of talents.

* * * * *